US010671486B2

(12) United States Patent
Mehrotra et al.

(10) Patent No.: US 10,671,486 B2
(45) Date of Patent: Jun. 2, 2020

(54) FLASHCOPY TRACKING FOR STORAGE OPTIMIZATION

(71) Applicant: International Business Machines Corporation, Armonk, NY (US)

(72) Inventors: Sumit Mehrotra, Pune (IN); Sonar Jeetendra Rajendra, Pune (IN); Deepak Pandey, Pune (IN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 16/045,626

(22) Filed: Jul. 25, 2018

(65) Prior Publication Data

US 2020/0034242 A1 Jan. 30, 2020

(51) Int. Cl.

| | |
|---|---|
| ***G06F 12/02*** | (2006.01) |
| ***G06F 11/14*** | (2006.01) |
| ***G06F 3/06*** | (2006.01) |

(52) U.S. Cl.

CPC .......... *G06F 11/1451* (2013.01); *G06F 3/065* (2013.01); *G06F 3/067* (2013.01); *G06F 3/0619* (2013.01); *G06F 3/0653* (2013.01); *G06F 11/1464* (2013.01); *G06F 12/0253* (2013.01); *G06F 2201/84* (2013.01); *G06F 2201/88* (2013.01); *G06F 2212/7204* (2013.01)

(58) Field of Classification Search

CPC ...... G06F 3/0619; G06F 3/065; G06F 3/0653; G06F 3/067; G06F 3/0688; G06F 11/1451; G06F 11/1464; G06F 12/0253; G06F 2201/84; G06F 2201/88; G06F 2212/7204

USPC .................................. 707/639; 711/103, 162

See application file for complete search history.

(56) References Cited

U.S. PATENT DOCUMENTS

| | | | | |
|---|---|---|---|---|
| 6,748,504 | B2 | 6/2004 | Sawdon et al. | |
| 6,772,302 | B1 | 8/2004 | Thompson | |
| 6,959,369 | B1 | 10/2005 | Ashton et al. | |
| 6,993,539 | B2 | 1/2006 | Federwisch et al. | |
| 10,248,336 | B1 * | 4/2019 | Koujalagi | G06F 3/067 |
| 2010/0228919 | A1 | 9/2010 | Stabrawa et al. | |
| 2012/0078848 | A1 | 3/2012 | Jennas, II et al. | |
| 2012/0246424 | A1 * | 9/2012 | Yuhara | G06F 11/1456 711/162 |
| 2016/0162510 | A1 * | 6/2016 | Hildebrand | G06F 16/178 707/634 |
| 2016/0203055 | A1 | 7/2016 | Dain et al. | |
| 2017/0083250 | A1 | 3/2017 | Beeken et al. | |
| 2017/0161153 | A1 | 6/2017 | Dain et al. | |
| 2017/0308305 | A1 * | 10/2017 | Goel | G06F 3/0608 |

* cited by examiner

*Primary Examiner* — Gary J Portka

(74) *Attorney, Agent, or Firm* — Kunzler Bean & Adamson

(57) ABSTRACT

Methods that can optimize data storage via tracking flashcopy use are provided. One method includes storing flashcopies of data to a target volume in which the data is stored on a source volume and each flashcopy represents a particular portion of the data. The method further includes tracking a quantity of input/output (I/O) requests for each respective portion of the data on the target volume represented by a flashcopy and copying a particular portion of the data from the source volume to the target volume in response to receiving a predetermined quantity of I/O requests on the target volume for the particular portion of the data. Systems and apparatus that can include, perform, and/or implement the methods are also provided.

20 Claims, 22 Drawing Sheets

800

STORE FLASHCOPIES TO TARGET VOLUME — 802

TRACK QUANTITY OF I/O REQUESTS DIRECTED TO DATA REPRESENTED BY FLASHCOPIES AND/OR TO THE DATA ITSELF — 804

CREATE COPY OF PARTICULAR DATA IN RESPONSE TO A PREDETERMINED QUANTITY OF I/O REQUESTS FOR THE PARTICULAR DATA AND/OR TO A FLASHCOPY — 806

STORE THE COPY OF THE PARTICULAR DATA TO TARGET VOLUME — 808

REPLACING THE FLASHCOPY ON THE TARGET VOLUME WITH THE COPY — 810

FLASHCOPY TRACKING FOR STORAGE OPTIMIZATION

FIELD

The subject matter disclosed herein relates to storage networks and systems and, more particularly, relates to apparatus, systems, and methods that can optimize data storage via tracking the number of times that a flashcopy of data is requested and/or utilized.

BACKGROUND

Conventional storage environments usually balance the need to ensure that data is not lost with the need to efficiently use the finite amount of storage space available in a particular storage environment. To prevent and/or reduce the possibility of data loss, conventional storage environments often create redundant copies of the data stored therein. While this is an effective technique of preserving data, the store redundant copy of the data reduces the amount of space available to store other data. Some conventional storage environments utilize snapshots as part of a balancing technique that can improve storage efficiency and/or data integrity.

A snapshot is a set of pointers or reference markers for data at a particular point in time. Snapshots are created to preserve point in time copies of the data to which point in time a storage system can be rolled back to in the event that the data becomes otherwise unavailable. Traditionally, snapshots are available on instant basis to other applications involved in data analysis, data protection, and/or data replication. The data related copy is usually constantly and/or consistently available to the other applications. However, a snapshot can also be available as a backup copy to perform other functions on the data. Since a snapshot is a set of pointers and not an actual copy of the data itself, a snapshot can reduce the amount of storage space utilized to provide a “copy” or pseudo-copy of the data compared to an actual copy.

While the use of snapshots can assist a storage environment in more efficiently using storage space by providing a copy of the data that utilizes a smaller amount of storage space compared to an actual copy, there can be circumstances in which certain data can cause a storage environment that utilizes snapshots to experience a greater amount of latency than necessary. For example, some data may be repeatedly requested by a host computing device, which causes a volume storing a snapshot or flash copy of the data (e.g., a target volume) that is the recipient of the requests to further request the actual data from a volume storing the data (e.g., a source volume) prior to transmitting the data to the host computing device. This situation can cause an extra amount of time compared to a situation in which the actual data is being stored on the target volume because of the extra processing time needed to request the actual data from the source volume. However, as discussed above, redundantly storing an actual copy of all of the data stored on the source volume to the target volume would come at the cost of storage space on the target volume.

BRIEF SUMMARY

Methods, systems, and apparatus that can optimize data storage via tracking flashcopy use are provided. One method includes storing, by a processor, flashcopies of data to a target volume in which the data is stored on a source volume and each flashcopy represents a particular portion of the data stored on the source volume. The method further includes tracking a quantity of input/output (I/O) requests for each respective portion of the data on the target volume represented by a flashcopy and copying a particular portion of the data from the source volume to the target volume in response to receiving a predetermined quantity of I/O requests on the target volume for the particular portion of the data.

A system includes a source volume that stores data, a target volume that stores flashcopies of the data in which each flashcopy represents a particular portion of the data stored on the source volume, and a processor. The processor is configured to track a quantity of I/O requests for each respective portion of the data on the target volume represented by a flashcopy and copy a particular portion of the data from the source volume to the target volume in response to receiving a predetermined quantity of I/O requests on the target volume for the particular portion of the data.

One apparatus includes a flash module that stores flashcopies of data to a target volume in which the data is stored on a source volume and each flashcopy represents a particular portion of the data. The apparatus further includes a tracking module that tracks a quantity of I/O requests for each respective portion of the data on the target volume represented by a flashcopy and a copy module that copies a particular portion of the data from the source volume to the target volume in response to receiving a predetermined quantity of I/O requests on the target volume for the particular portion of the data. In various embodiments, at least a portion of the flash module, tracking module, and/or tracking module comprise(s) a set of hardware circuits, a set of programmable hardware devices, and/or executable code stored on a set of non-transitory computer-readable storage mediums.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
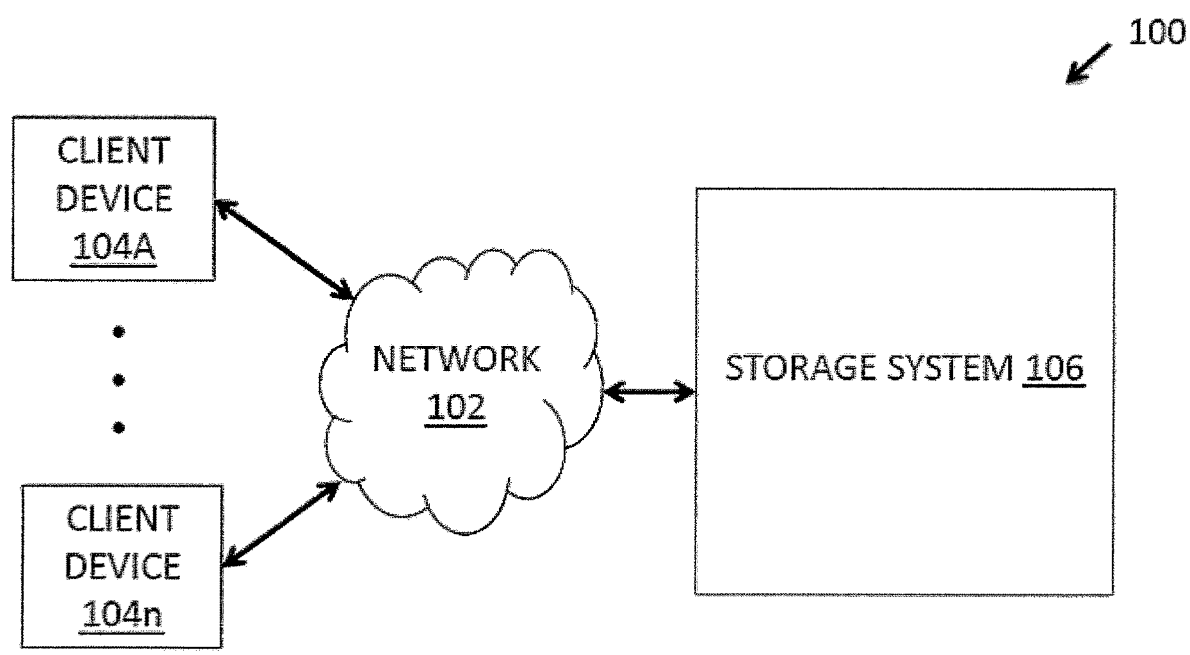
FIG. 1 is a block diagram of one embodiment of a storage network.

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104A through 104*n* and a storage system 106. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 102. Each client device 104, as part of its respective operation, relies on sending input/output (I/O) requests to the storage system 106 to write data, read data, and/or modify data. Specifically, each client device 104 can transmit I/O requests to read, write, store, communicate, propagate, and/or transport instructions, data, computer programs, software, code, routines, etc., to the storage system 106 and may comprise at least a portion of a client-server model. In general, the storage system 106 can be accessed by the client device(s) 104 and/or communication with the storage system 106 can be initiated by the client device(s) 104 through a network socket (not shown) utilizing one or more inter-process networking techniques.

Figure 2:
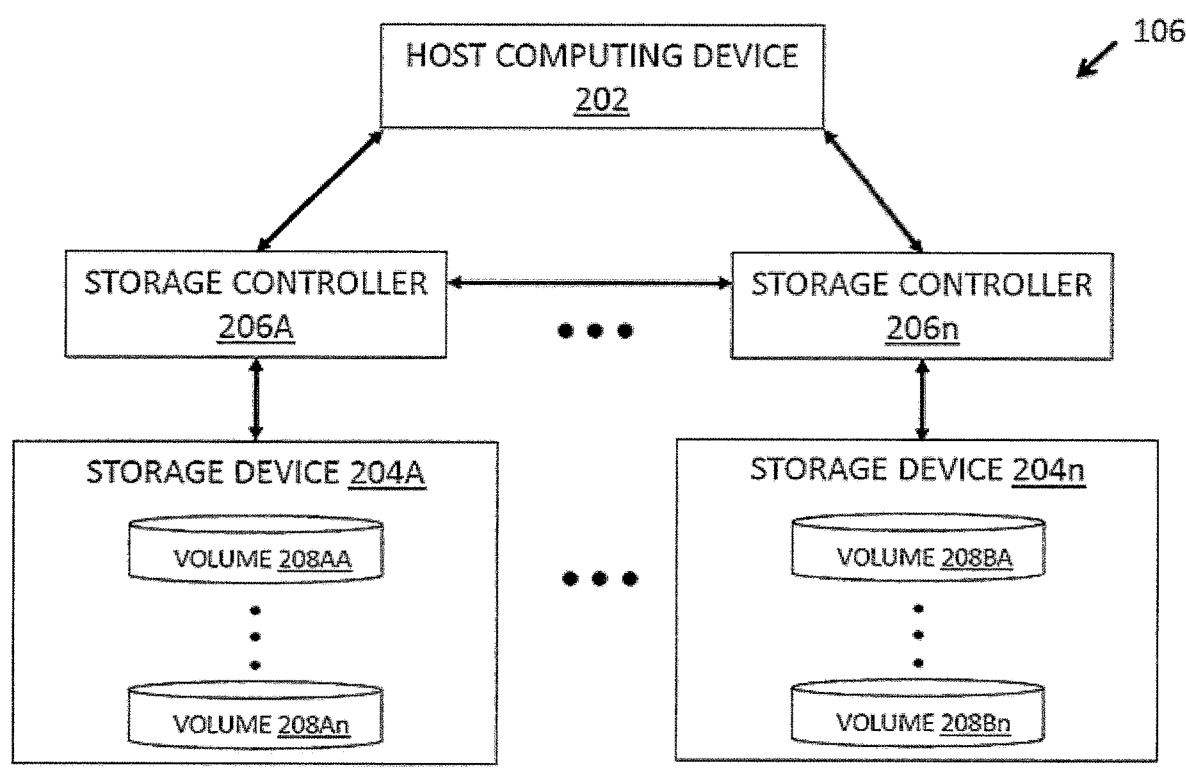
FIG. 2 is a block diagram of one embodiment of a storage system included in the storage network of FIG. 1.

Referring to FIG. 2, Figure is a block diagram of one embodiment of the storage system 106 illustrated in and discussed with reference to FIG. 1. The storage system 106, at least in the illustrated embodiment, includes, among other components, a host computing device 202, a set of storage devices 204A through 204*n*, and a set of storage controllers 206A through 206*n*.

A host computing device 202 (also, simply host 202) may include any suitable computer hardware and/or software that is known or developed in the future that can provide host operations. In various embodiments, a host 202 can include one or more processors, computer-readable memory, and/or one or more interfaces, among other features and/or hardware. A host 202 can further include any suitable software component or module, or computing device(s) that is/are capable of hosting and/or serving a software application or services, including distributed, enterprise, and/or cloud-based software applications, data, and services. For instance, a host 202 can be configured to host, serve, or otherwise manage data sets, or applications interfacing, coordinating with, or dependent on or used by other services, including transportation service applications and software tools. In some instances, a host 202 can be implemented as some combination of devices that can comprise a common computing system, server, server pool, or cloud computing environment and share computing resources, including shared memory, processors, and interfaces.

In various embodiments, a host 202 can receive I/O requests (e.g., read requests, write requests, etc.) from one or more client devices 104. In some embodiments, in response to receiving a read request, a host 202 can issued a read request (or read command) to one or more storage controllers (e.g., storage controller 206A and storage controller 206*n*, etc.) for one or more storage devices (e.g., storage device 204A and storage device 204*n*, etc.), as discussed elsewhere herein.

The set of storage devices 204A through 204*n* (also simply referred individually, in various groups, or collectively as storage device(s) 204) may include any suitable device and/or system that is known or developed in the future that can store computer-useable data. In various embodiments, a storage device 204 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

Each storage device 204 includes a set of storage volumes or simply, volumes. As illustrated in FIG. 2, storage device 204A includes a set of volumes 208AA through 208An and storage device 204*n* includes a set of volumes 208BA through 208Bn in which the volumes 208AA-208An and/or 208BA-208Bn may simply referred individually, in various groups, or collectively as volume(s) 208.

A volume 208 may include any suitable volume, logical volume, and/or storage volume that is known or developed in the future. In various embodiments, a volume may be referred to as a logical unit number (LUN) and can be divided to include a set of partitions.

One or more volumes 208 can provide data storage that appear to a user as a single storage device, and which may be accessed using a continuous range of logical block addresses (LBAs), but may actually include multiple physical storage devices of different types. Data on a volume 208 can be stored as allocation units, or extents, which refers to units of data that are transferred to and from storage devices 204 by storage controllers 206, as discussed elsewhere herein.

An extent may contain one or more grains, which are small, configurable units of storage. A grain may include one or more data blocks, which are the smallest addressable units of storage on a volume 208 (or LUN). While extents may range in size from hundreds of megabytes (MBs) to several gigabytes (GBs), grains typically range in size from a few kilobytes (KBs) to single digit MBs.

In various embodiments, a set of snapshots of the data stored on a volume 208 can be created and stored on another volume 208. To do such, in various embodiments, a source-target relationship can be established between the volumes 208 to create a flashcopy pair of volumes 208. In some embodiments, the data stored in storage devices 204 can have their data spread across several volumes 208, and their volumes 208 can all be flashcopied at the same, or substantially the same, point-in-time. Flashcopy offers consistency groups, which can allow multiple volumes 208 to be flashcopied at the same instance. When a flashcopy process begins, the relationship between a volume and target volume 208 can be established by creating a pointer table, including a bitmap for the target volume 208.

For example, a set of snapshots of the data stored on volume 208AA of storage device 204A can be created and/or flashcopied (e.g., stored) on volume 208BA of a storage device 204*n*. Here, the volume 208AA is considered the source or source volume because the actual data is stored thereon, while the volume 208BA is considered the target or target volume because the snapshots and/or flashcopies of the actual data stored in the volume 208AA is stored thereon, among other examples that are possible and contemplated herein.

In additional or alternative embodiments, a volume 208 may simultaneously store a copy of actual data and a snapshot (flashcopy) of the actual data stored on another volume 208 of another storage device 204. For example, a volume 208AA may store a snapshot of data stored on a volume 208Bn and an actual copy of the data on the volume 208Bn from which the snapshot was created, among other examples that are possible and contemplated herein.

In further additional or alternative embodiments, volumes 208 on different storage devices 204 may simultaneously store the same actual data. For example, a volume 208An and a volume 208Bn may store the same actual data such that the data stored respectively thereon are copies of one another, among other examples that are possible and contemplated herein.

As further illustrated in FIG. 2, storage device 204A is coupled to and/or in communication with a storage controller 206A and storage device 204*n* is coupled to and/or in communication with a storage controller 206*n*. That is, each storage device 204 is coupled to and/or in communication with a storage controller 204A, 204*n*, which can simply be referred to individually, in various groups, or collectively as storage controller(s) 206.

A storage controller 206 can include any suitable hardware and/or software that can receive I/O requests from a host 202 and perform one or more I/O operations on one or more storage devices 202 corresponding to the I/O request. For example, in response to receiving a read request from a host 202, a storage controller 206 can perform corresponding read operations on one or more of volumes 208AA through 208An of the storage device 204A. Specifically, the storage controller 206 can read and/or transfer the requested data from the storage device 204A (or the one or more of volumes 208AA through 208An) to the host 202.

Figure 3:
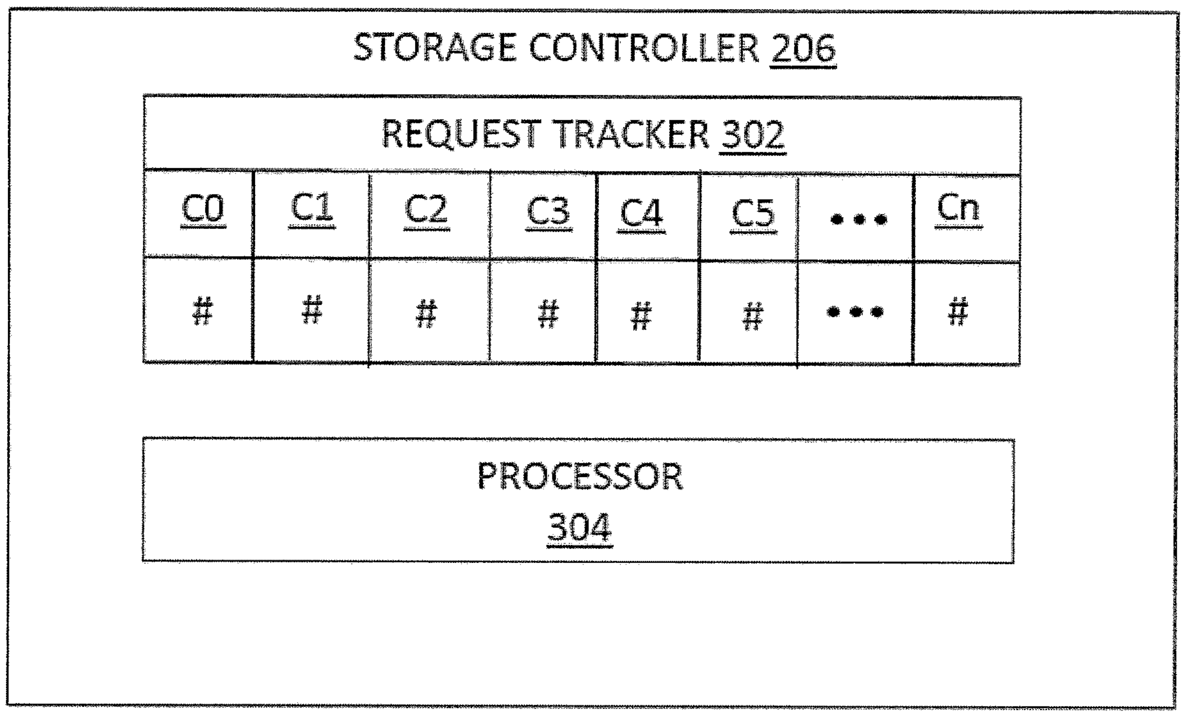
FIG. 3 is a block diagram of one embodiment of a storage controller included in the storage system of FIG. 2.

With reference to FIG. 3, FIG. 3 is a block diagram of one embodiment of a storage controller 206. At least in the illustrated embodiment, a storage controller 206 includes, among other components, a request tracker 302 and a processor 304 coupled to and/or in communication with one another.

A request tracker 302 may include any suitable hardware and/or software that is known or developed in the future that can store data in an organized and/or pre-determined manner for tracking the number of times or quantity of I/O requests (e.g., read requests, write requests, etc.) directed to grains of data stored on a source device and/or to one or more snapshots (or flashcopies) of a set of snapshots on a target device that represent the grains of data stored on the source device. Examples of a request tracker 302 can include, but are not limited to, a bitmap, a table, a chart, and a graph, etc., among other examples that are possible and contemplated herein.

In various embodiments, a request tracker 302 can include a set of counters C (e.g., C0 through Cn, also simply referred individually, in various groups, or collectively as counter(s) C). A counter C may include any suitable hardware and/or software that can be incremented and/or decremented that is known or developed in the future.

In various embodiments, one or more counters C in the set of counters C is stored on a target volume 208 and each counter C can be associated with a portion of data (e.g., grain(s) of data, chunk(s) of data, segment(s) of data, block(s) of data, etc.) stored on a source volume 208 and/or a snapshot or flash copy representing the portion of data stored on the source volume 208. A counter C, in some embodiments, can be incremented each time that an I/O request is directed to a grain of data stored on a source volume 208 and/or to a snapshot or flashcopy on a target volume 208 representing the grain of data.

A request tracker 302 can include any suitable size that corresponds to the size of a storage device 204 (e.g., a target storage device 204) and/or a volume 208 (e.g., a target storage volume 208). Further, a request tracker 302 can track I/O requests for any suitable quantity of grains of data stored on a storage device 204 (e.g., a source storage device 204) and/or a volume 208 (e.g., a source storage volume 208) and/or quantity of snapshots and/or flashcopies stored on a storage device 204 (e.g., a target storage device 204) and/or a volume 208 (e.g., a target storage volume 208) representing the data stored on the source storage device 204 and/or source storage volume 208.

In addition, a counter C may be incremented by any suitable quantity (e.g., incremented by one count, among other quantities that are possible and contemplated herein) each time that that a received I/O request is directed to a grain of data on a storage device 204 (e.g., a source storage device 204) and/or a volume 208 (e.g., a source storage volume 208) and/or to a snapshot or flashcopy on a target volume 208 representing the grain of data on the source storage device 204 and/or source storage volume 208. Further, a counter C may be incremented up to and/or including any suitable maximum quantity/amount of increments (e.g., may include any suitable bit size and/or quantity of bits). In various embodiments, each counter C may be incremented up to a predetermined value and/or a threshold value, as discussed elsewhere herein.

In a non-limiting example, a counter C associated with a particular grain of data on a source volume 208 and/or corresponding snapshot or flashcopy on a target volume 208 may be incremented by one count and/or incremental value each time that a received I/O request is directed to a particular grain of data and/or snapshot or flashcopy representing the particular grain of data. The counter C may continue to be incremented each time I/O request is directed to the particular grain of data and/or snapshot or flashcopy representing the particular grain of data until the predetermined value and/or threshold value is reached and/or exceeded.

As shown in the embodiment illustrated in FIG. 3, the request tracker 302 includes at least seven (7) counters (e.g., counter C0, counter 1, counter C2, counter C3, counter C4, counter C5, counter C6, and counter Cn) to track the quantity of I/O requests directed to at least seven associated/corresponding grains of data represented by a snapshot or flashcopy on a target volume 208, for which the actual data is stored on a source volume 208. Here, the incremental quantity or count of each respective counter C in request tracker 302 is represented by the hashtag symbol (#). As such, each hashtag # can represent a quantity or count value that is greater than or equal to zero (0) for its associated snapshot and/or flashcopy.

While the embodiment illustrated in FIG. 3 shows seven counters C associated with seven snapshots/flashcopies of respective grains of data, the various embodiments discussed herein are not limited to seven counters, grains of data on a source volume 208 or source storage device 204, and/or snapshots/flashcopies of a target volume 208 or target storage device 204 representing the data stored on the source volume 208 or source storage device 204. That is, various other embodiments may include a greater quantity or smaller quantity of counters, grains of data, and/or snapshots/flashcopies than seven counters, grains of data, and/or snapshots/flashcopies.

Further, the predetermined value and/or threshold value may include any suitable value and/or increment. In various embodiments, the predetermined value and/or threshold value can be determined by a user and/or may be determined by a particular application for which the storage system 106 is being applied.

A processor 304 may include any suitable processing hardware and/or software capable of performing computer processes, functions, and/or algorithms. In various embodiments, a processor 304 is configured to facilitate communication between computing components or nodes (e.g., host computing device 202, storage device(s) 204, and storage controller(s) 206, etc.) in the storage system 106.

Figure 4A:
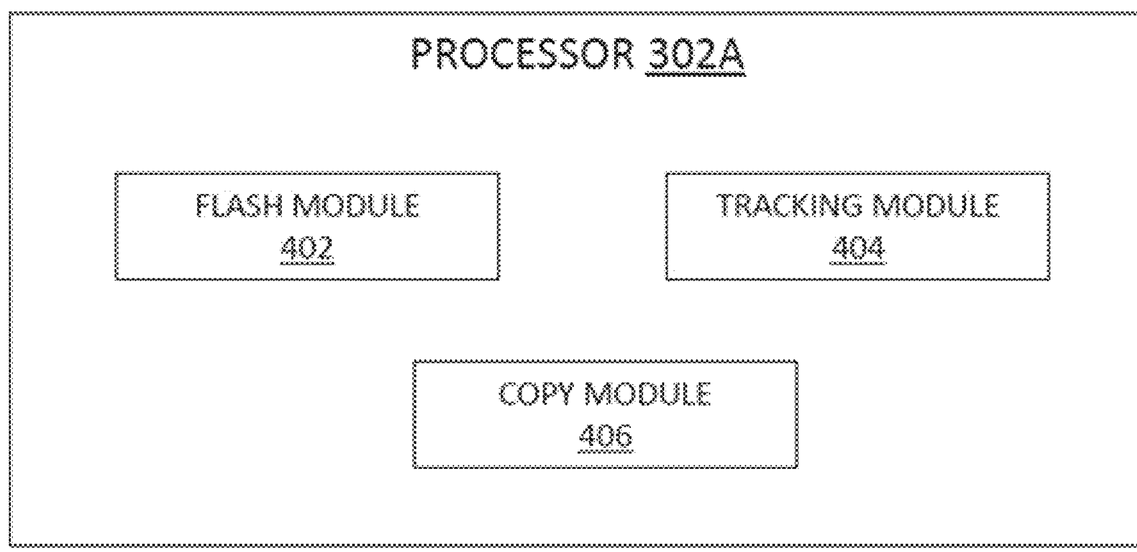
FIGS. 4A and 4B are block diagrams of various embodiments of a processor included in the storage controller of FIG. 3.

With reference to FIG. 4A, FIG. 4A is a block diagram of one embodiment of a processor 304A. At least in the illustrated embodiment, the processor 302A includes, among other components, a flash module 402, a tracking module 404, and a copy module 406.

A flash module 402 may include any suitable hardware and/or software that can create and store snapshots and/or flashcopies to a target volume 208 (and/or target storage device 204) of data stored on a source volume 208 (and/or source storage device 204). A flash module 402 may utilize any suitable technique that is known or developed in the future that can create and store the snapshots and/or flashcopies to the target volume 208 (and/or target storage device 204).

A tracking module 404 may include any suitable hardware and/or software that can track the number of times or quantity of I/O requests (e.g., read requests, write requests, etc.) directed to one or more grains of data of a set of data stored on a source device and/or snapshots (or flashcopies) of a set of snapshots on a target device that represent the grains of data stored on a source device. In various embodiments, a tracking module 404 can identify to which particular grain of data and/or snapshot or flashcopy on a target volume 208 and/or target storage device 204 representing a grain of data in an I/O request (e.g., a read request, write request, etc.) is directed. In some embodiments, the I/O request can include a read request.

In various embodiments, a tracking module 404 can increment a counter C in a request tracker (e.g., request tracker 302) associated with a particular grain of data and/or snapshot/flashcopy each time that an I/O request (e.g., a read request) is directed to a grain of data represented by the particular snapshot/flashcopy on a target volume 208 or target storage device 202 and/or to the grain of data itself. In additional or alternative embodiments, a tracking module 404 can determine if/when a counter C associated with a particular snapshot/flashcopy and/or grain of data has been incremented to and/or includes a predetermined and/or threshold count/value. In response to determining that a counter C associated with a particular snapshot/flashcopy and/or grain of data has been incremented to and/or includes a predetermined and/or threshold count/value, the tracking module 404 can notify a copy module 406 that the counter C associated with a particular snapshot/flashcopy and/or grain of data has been incremented to and/or includes the predetermined and/or threshold count/value.

A copy module 406 may include any suitable hardware and/or software that can copy data stored on a source volume 208 and/or source storage device 204 to a target volume and/or target storage device 204. In various embodiments, a copy module 406 can create an exact or a substantially exact copy of a grain of data stored on a source volume 208 and/or source storage device 204 to a target volume 208 and/or target storage device 204, among other sizes of data that are possible and contemplated herein.

In some embodiments, the grain of data that is copied from the source volume 208 and/or source storage device 204 to the target volume 208 and/or target storage device 204 includes a snapshot and/or flashcopy of the grain of data on the target volume 208 and/or target storage device 204 prior to the copy being copied, transferred, and/or stored on the target volume 208 and/or target storage device 204. In additional or alternative embodiments, the grain of data from which the copy is made can continue to reside and/or be stored on the source volume 208 and/or source storage device 204 after the copy is created, transferred, and/or stored on the target volume 208 and/or target storage device 204.

Figure 4B:
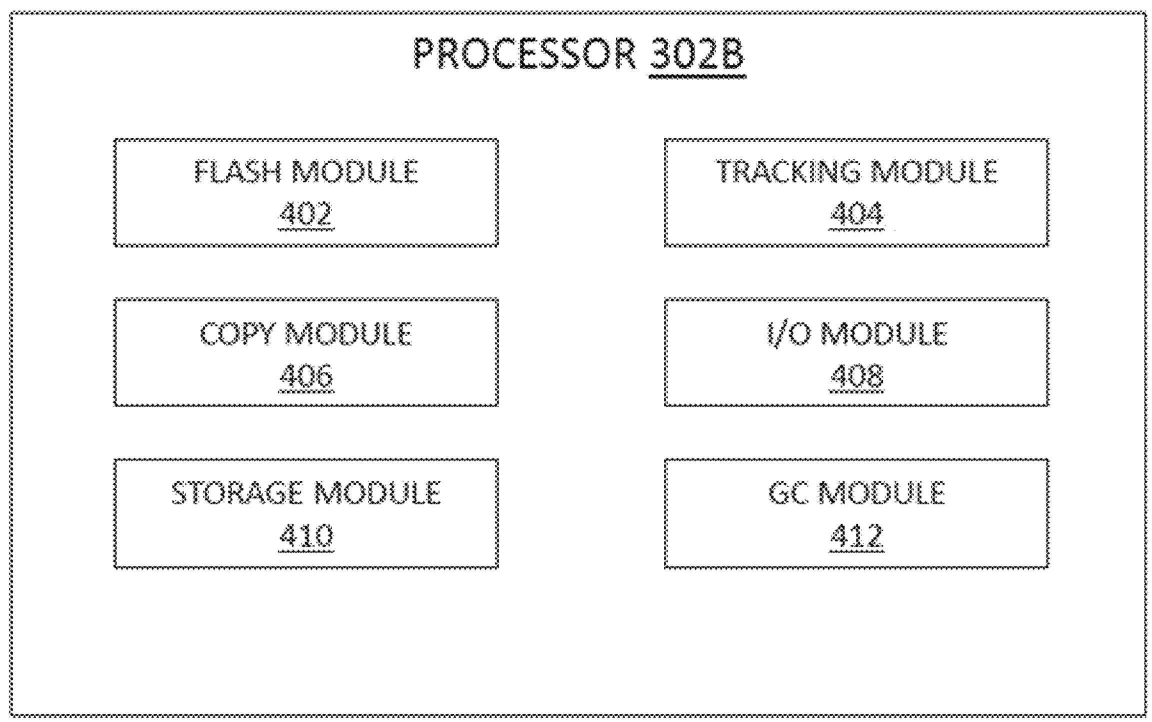

Referring to FIG. 4B, FIG. 4B is a block diagram of one embodiment of a processor 304B. The processor 302B includes, among other components, a flash module 402, a tracking module 404, and a copy module 406 similar to the various embodiments of a processor 304A discussed elsewhere herein. At least in the illustrated embodiment, the processor 302B further includes an I/O module 408, a storage module 410, and a garbage collection (GC) module 412.

An I/O module 408 may include any suitable hardware and/or software that can receive I/O requests from a host 202 and perform one or more I/O operations on one or more storage devices 202 corresponding to the I/O request. For example, in response to receiving a read request from a host 202, an I/O module 408 can perform corresponding read operations on one or more of volumes 208AA through 208An of the storage device 204A. Specifically, the I/O module 408 can read and/or transfer the requested data from the storage device 204A (or the one or more of volumes 208AA through 208An) to the host 202.

A storage module 410 may include any suitable hardware and/or software that can transfer and/or store a copy of a grain data stored on a source volume 208 and/or source storage device 204 to a target volume 208 and/or target storage device 204. In various embodiments, a storage module 410 can transfer and/or store the copied grain of data to the target volume 208 and/or target storage device 204 in response to receiving notice from a copy module 406 that a copy of the grain of data on the source volume 208 and/or source storage device 204 has been created and/or generated. As such, various embodiments of a copy module 406 can transmit such notice in response to creating and/or generating a copy of the grain of data on the source volume 208 and/or source storage device 204 for transfer and/or storage on the target volume 208 and/or target storage device 204.

In some embodiments, a storage module 410 can replace a snapshot and/or flashcopy of a grain of data stored on a target volume 208 and/or target storage device 204 with the copy of the grain of data generated/copied from the actual data stored on the source volume 208 and/or source storage device 204. Here, the target volume 208 and/or target storage device 204 may only store the copy of the grain of data and no longer store the snapshot and/or flashcopy of the grain of data.

In other embodiments, a storage module 410 can store the copy of a grain of data in the same location or a different location than the snapshot and/or flashcopy of the grain of data. In some embodiments, the storage module 410 can transfer the snapshot and/or flashcopy of the grain of data to a new storage location on the target volume 208 and/or target storage device 204 and store the copy of the grain of data to the storage location on the target volume 208 and/or target storage device 204 vacated by the snapshot and/or flashcopy. Here, the target volume 208 and/or target storage device 204 can store both the copy of the grain of data and the snapshot/flashcopy of the grain of data.

In other embodiments, the storage module 410 can maintain the snapshot and/or flashcopy of the grain of data at the same storage location on the target volume 208 and/or target storage device 204 and store the copy of the grain of data to a different storage location on the target volume 208 and/or target storage device 204. Here, the target volume 208 and/or target storage device 204 can store both the copy of the grain of data and the snapshot/flashcopy of the grain of data.

In various embodiments, the storage module 410 can maintain and/or continue to store the snapshot/flashcopy of the grain of data for a threshold amount of time after a copy of the data has been stored on the target volume 208 and/or target storage device 204 and/or until the occurrence of a predetermined event, which can be any suitable amount of time and/or any suitable event. A storage module 410, in response to expiration of the threshold amount of time, the occurrence of the predetermined event, and/or upon storing the copy of the grain of data on the target volume 208 and/or target storage device 204, can transmit a notice to a GC module 412 that the snapshot and/or flashcopy of the grain of data can be removed and/or deleted from the target volume 208 and/or target storage device 204.

A GC module 412 may include any suitable hardware and/or software that can remove and/or delete a snapshot and/or flashcopy of a grain of data from a target volume 208 and/or target storage device 204. A GC module 412 may utilize any garbage collection technique and/or process that is known of developed in the future that can remove and/or delete a snapshot and/or flashcopy of a grain of data from a target volume 208 and/or target storage device 204. In various embodiments, a GC module 412 can remove, delete, and/or perform a garbage collection technique/process on a snapshot and/or flashcopy of a grain of data on a target volume 208 and/or target storage device 204 in response to receiving a notice from a storage module 410 that the snapshot and/or flashcopy of the grain of data can be removed and/or deleted from the target volume 208 and/or target storage device 204.

Figure 5A:
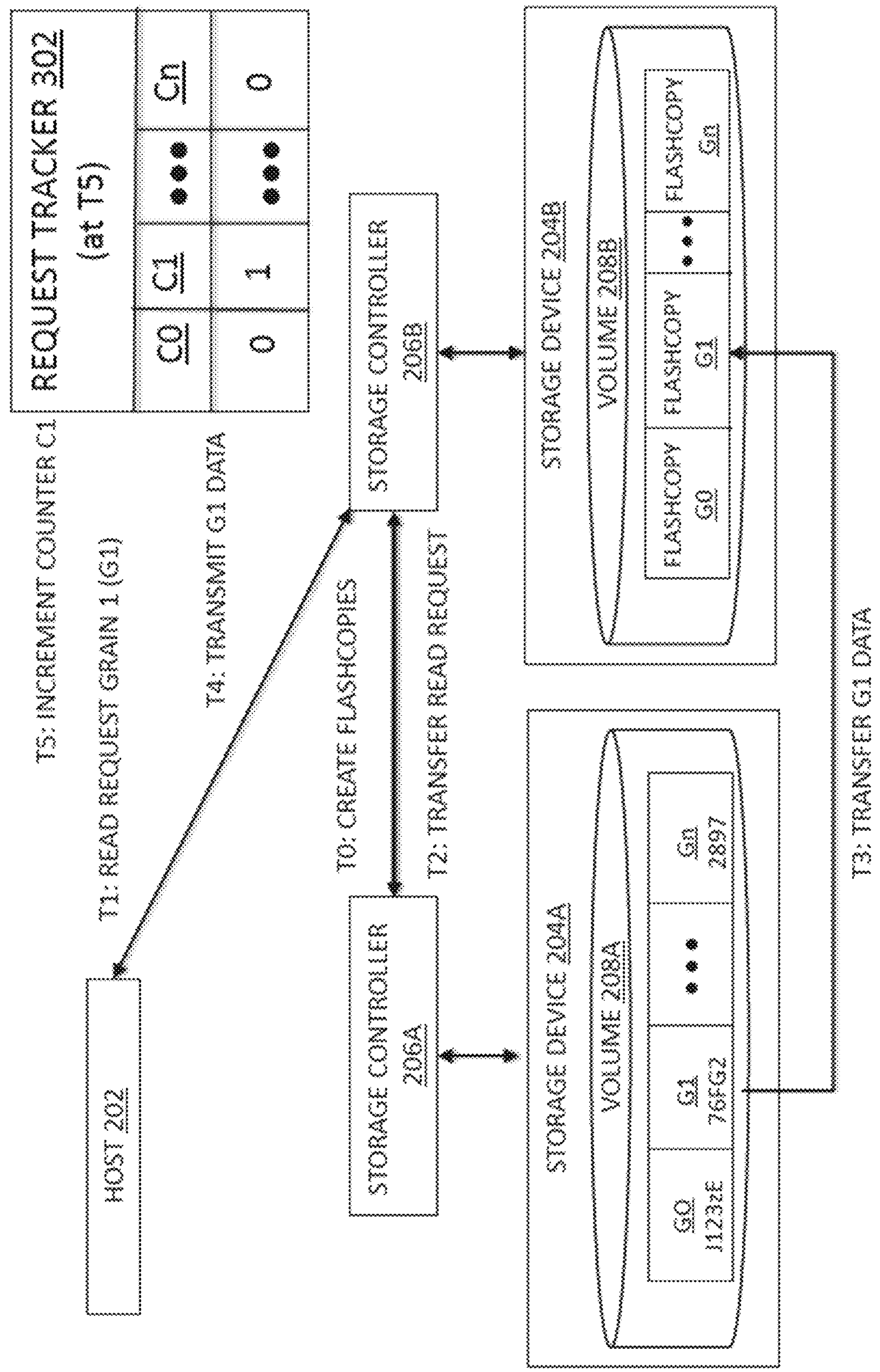
FIGS. 5A through 5K are timing diagrams of operations for one embodiment of the storage system of FIG. 2.

With reference to FIGS. 5A through 5K, FIGS. 5A through 5K are timing diagrams of one embodiment of operations for a storage system 106. In FIG. 5A, at least in the illustrated embodiment, the operations begin at time T0 by a processor (e.g., processor 302A and processor 302B, etc.) creating a set of flashcopies (e.g., flashcopy G0, flashcopy G1, . . . flashcopy Gn) and/or snapshots (space-efficient snapshots) representing and/or pointing to portions of data (e.g., grains of data G0, G1, . . . Gn) stored in a source volume 208A and/or a source storage device 204A coupled to and/or in communication with a source storage controller 206A.

The set of flashcopies are stored in a target volume 208B and/or a target storage device 204B coupled to and/or in communication with a target storage controller 206B. Further, a request tracker 302 can utilize a set of counters (e.g., counters C0, C1, . . . Cn) associated with a respective flashcopy (e.g., flashcopies G0, G1, . . . Gn) and/or grain of data to track the quantity of I/O requests directed to each grain of data and its associated flashcopy. At time T0, the count of each counter C0, C1, . . . Cn can be set to and/or include a value of zero (0). In this embodiment/example, the predetermined count and/or threshold value for a counter C is five (5), although other quantities greater than five or less than five are possible and contemplated herein.

At time T1, the target storage controller 206B receives an I/O request (e.g., a read request) to read a portion (segment, grain, block, etc.) of data G1 (e.g., the portion of data stored at address G1 (76FG2)). In response to the request and determining that the G1 address on the target volume 208B includes a flashcopy pointing to the G1 address in the source volume 208A and determining that the counter C1 includes a count and/or value less than five, the target storage controller 206B can transfer the read request to the storage controller 206A (time T2).

The source storage controller 206A, at time T3 and in response to receiving the read request, can transfer the portion of data G1 to the target storage controller 206B. The target storage controller 206B can then transmit the portion of data G1 to the host 202 (at time T4).

At time T5, the target storage controller 206B can increment the counter C1 corresponding to the flashcopy stored at the address G1 on the target volume 208B. At time T5, the counter C0 corresponding to the flashcopy stored at the address G0 on the target volume 208B includes a value of zero (0), the counter corresponding to the flashcopy stored at the address G1 on the target volume 208B includes a value of one (1), and the counter Cn corresponding to the flashcopy stored at the address Gn on the target volume 208B includes a value of zero.

Figure 5B:
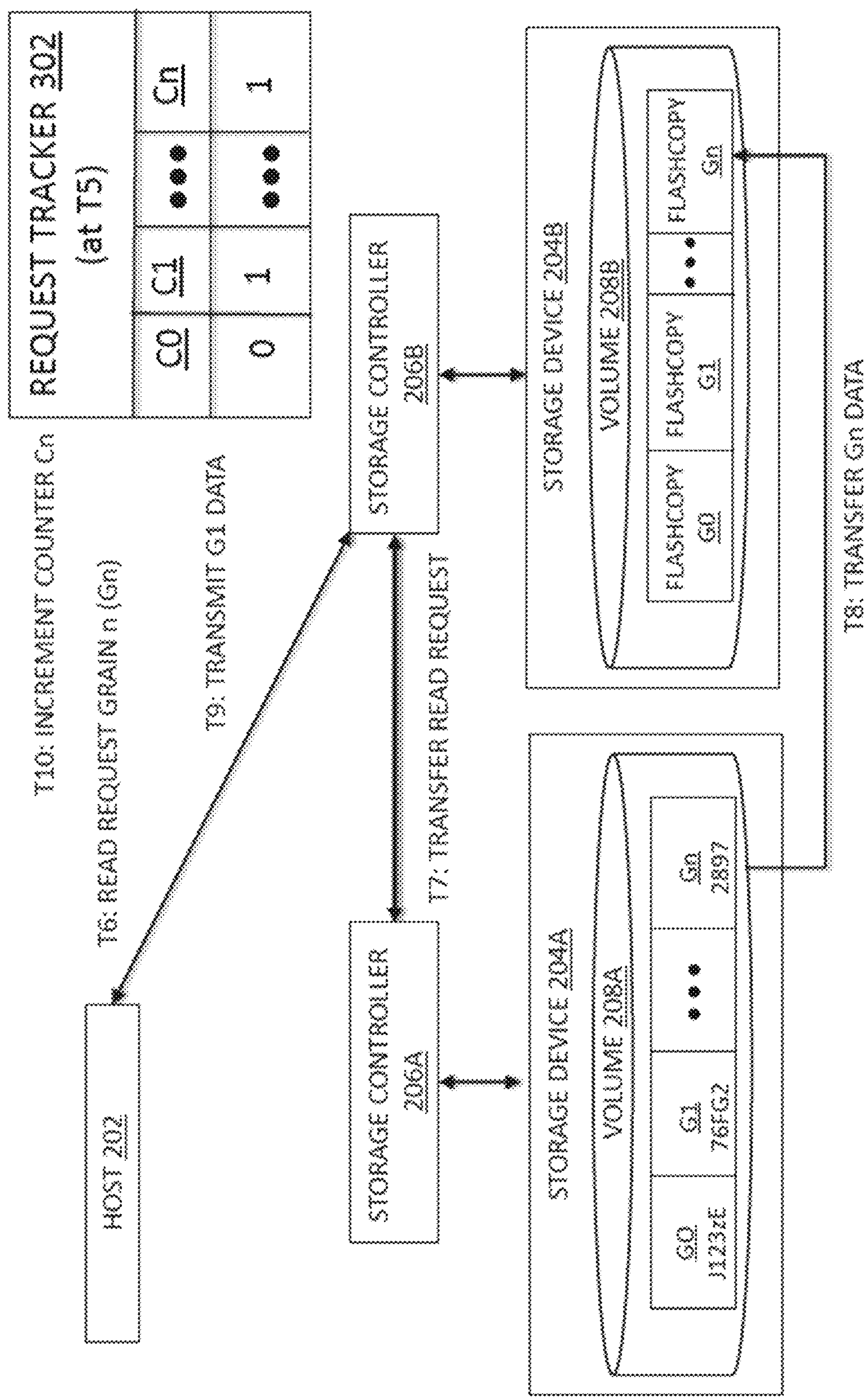

In FIG. 5B and at time T6, the target storage controller 206B receives an I/O request (e.g., a read request) to read a portion (segment, grain, block, etc.) of data Gn (e.g., the portion of data stored at address Gn (2897)). In response to the request and determining that the Gn address on the target volume 208B includes a flashcopy pointing to the Gn address in the source volume 208A and determining that the counter Cn includes a count and/or value less than five, the target storage controller 206B can transfer the read request to the storage controller 206A (time T7).

The source storage controller 206A, at time T8 and in response to receiving the read request, can transfer the portion of data Gn to the target storage controller 206B. The target storage controller 206B can then transmit the portion of data Gn to the host 202 (at time T9).

At time T10, the target storage controller 206B can increment the counter Cn corresponding to the flashcopy stored at the address Gn on the target volume 208B. At time T10, the counter C0 corresponding to the flashcopy stored at the address G0 on the target volume 208B includes a value of zero, the counter corresponding to the flashcopy stored at the address G1 on the target volume 208B includes a value of one, and the counter Cn corresponding to the flashcopy stored at the address Gn on the target volume 208B includes a value of one.

Figure 5C:
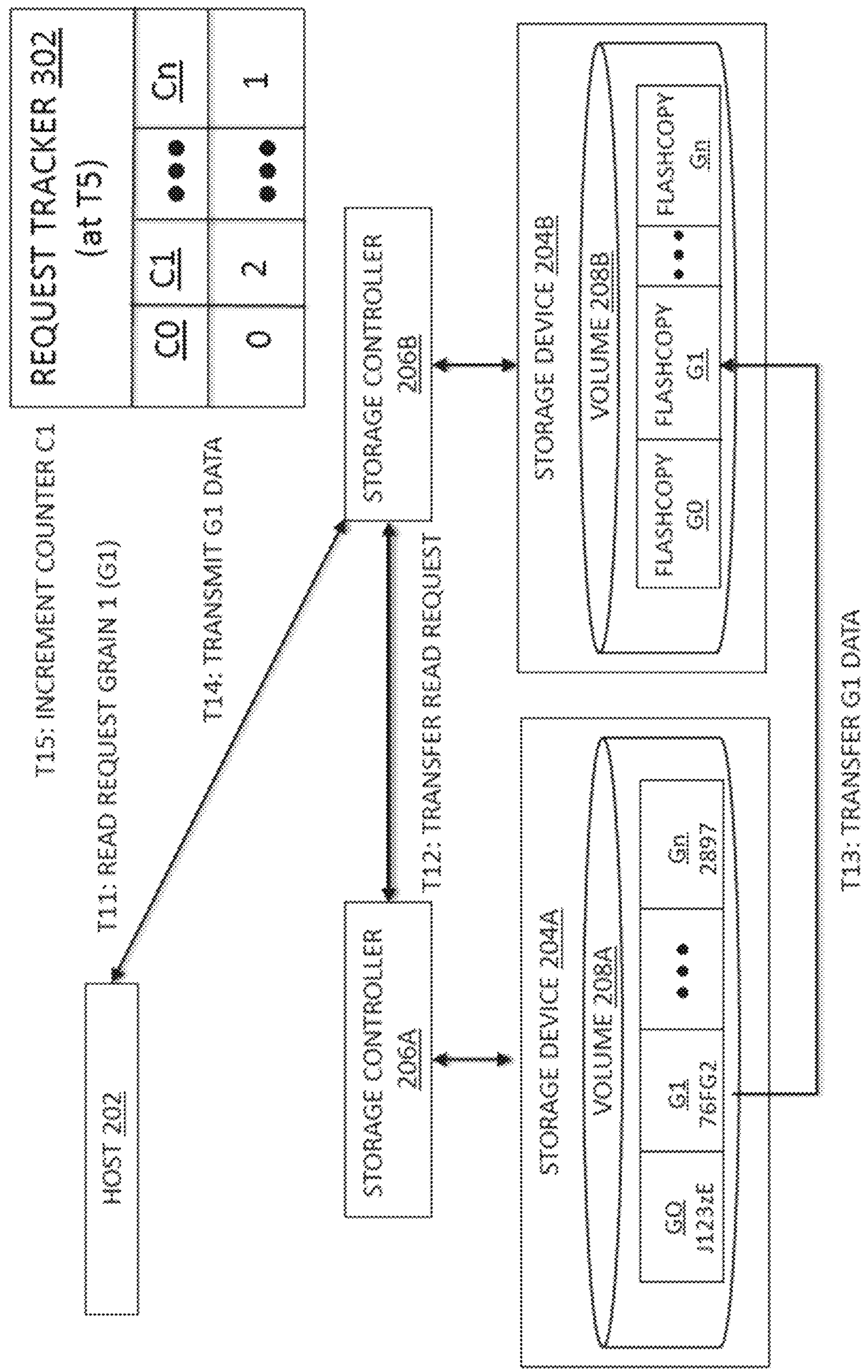

In FIG. 5C and at time T11, the target storage controller 206B receives an I/O request (e.g., a read request) to read the portion of data G1. In response to the request and determining that the G1 address on the target volume 208B includes a flashcopy pointing to the G1 address in the source volume 208A and determining that the counter C1 includes a count and/or value less than five, the target storage controller 206B can transfer the read request to the storage controller 206A (time T12).

The source storage controller 206A, at time T13 and in response to receiving the read request, can transfer the portion of data G1 to the target storage controller 206B. The target storage controller 206B can then transmit the portion of data G1 to the host 202 (at time T14).

At time T15, the target storage controller 206B can increment the counter C1 corresponding to the flashcopy stored at the address G1 on the target volume 208B. At time T15, the counter C0 corresponding to the flashcopy stored at the address G0 on the target volume 208B includes a value of zero, the counter corresponding to the flashcopy stored at the address G1 on the target volume 208B includes a value of two (2), and the counter Cn corresponding to the flashcopy stored at the address Gn on the target volume 208B includes a value of one.

Figure 5D:
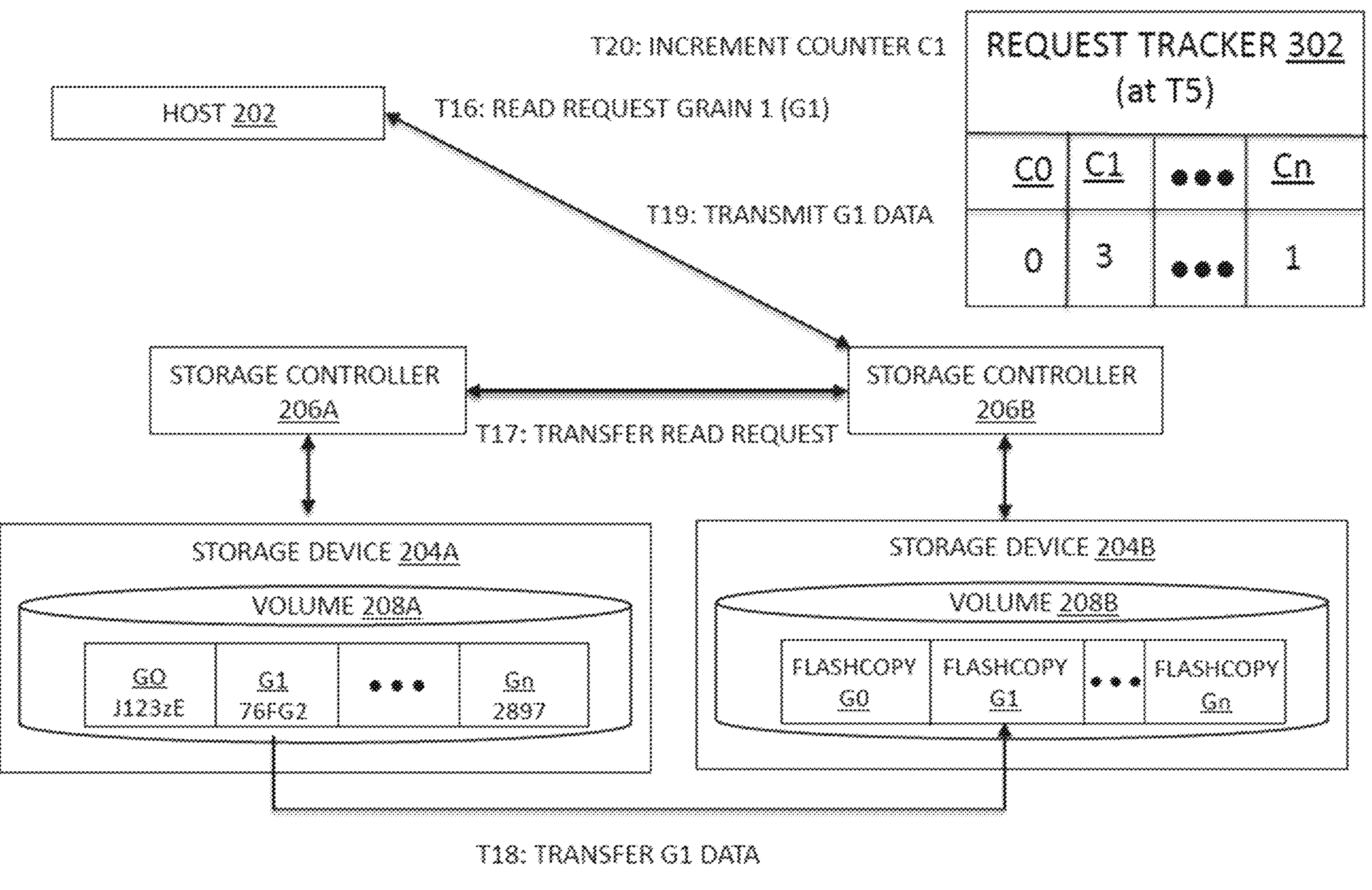

In FIG. 5D and at time T16, the target storage controller 206B receives an I/O request (e.g., a read request) to read the portion of data G1. In response to the request and determining that the G1 address on the target volume 208B includes a flashcopy pointing to the G1 address in the source volume 208A and determining that the counter C1 includes a count and/or value less than five, the target storage controller 206B can transfer the read request to the storage controller 206A (time T17).

The source storage controller 206A, at time T18 and in response to receiving the read request, can transfer the portion of data G1 to the target storage controller 206B. The target storage controller 206B can then transmit the portion of data G1 to the host 202 (at time T19).

At time T20, the target storage controller 206B can increment the counter C1 corresponding to the flashcopy stored at the address G1 on the target volume 208B. At time T20, the counter C0 corresponding to the flashcopy stored at the address G0 on the target volume 208B includes a value of zero, the counter corresponding to the flashcopy stored at the address G1 on the target volume 208B includes a value of three (3), and the counter Cn corresponding to the flashcopy stored at the address Gn on the target volume 208B includes a value of one.

Figure 5E:
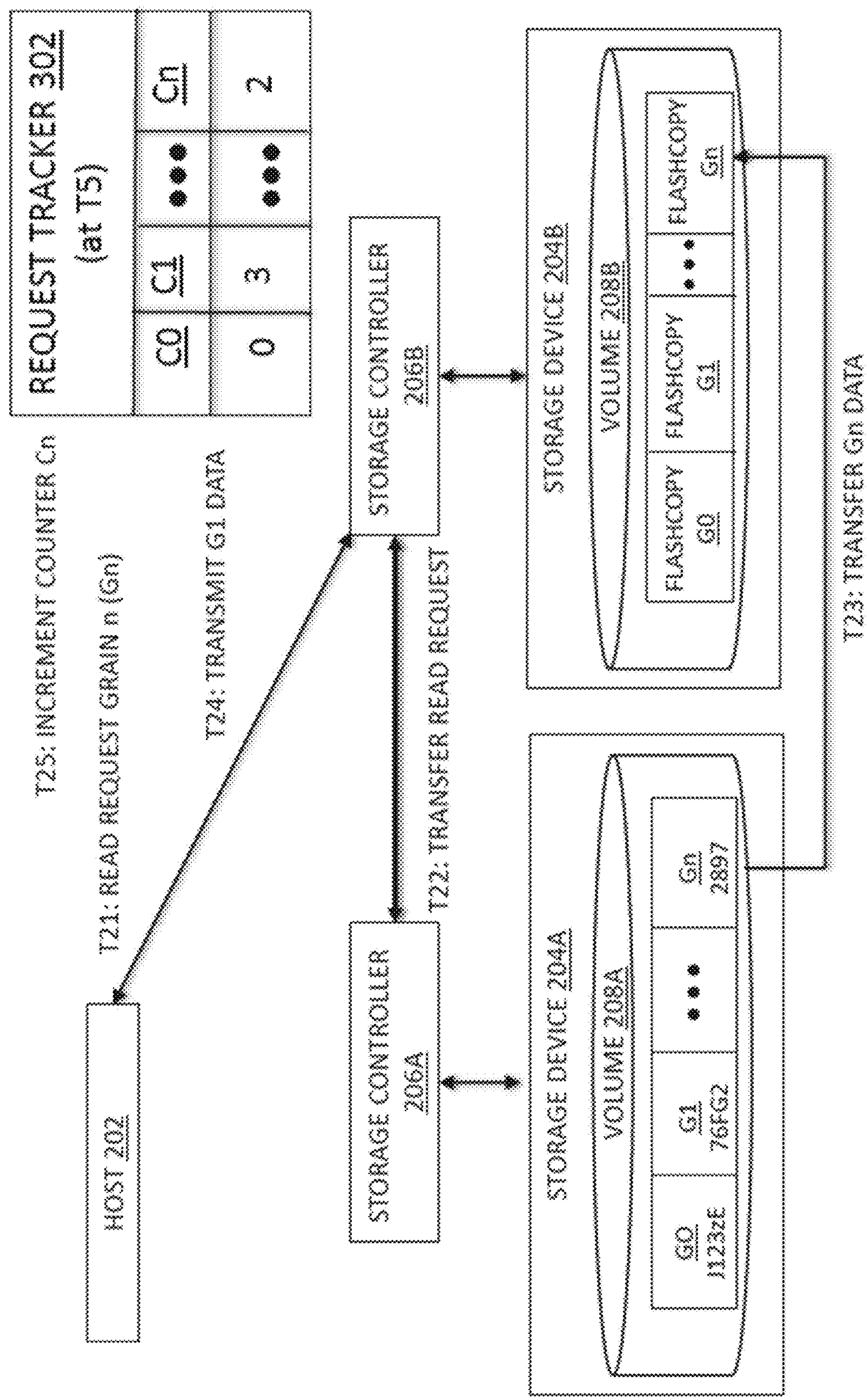

In FIG. 5E and at time T21, the target storage controller 206B receives an I/O request (e.g., a read request) to read the portion of data Gn. In response to the request and determining that the Gn address on the target volume 208B includes a flashcopy pointing to the Gn address in the source volume 208A and determining that the counter Cn includes a count and/or value less than five, the target storage controller 206B can transfer the read request to the storage controller 206A (time T22).

The source storage controller 206A, at time T23 and in response to receiving the read request, can transfer the portion of data Gn to the target storage controller 206B. The target storage controller 206B can then transmit the portion of data Gn to the host 202 (at time T24).

At time T25, the target storage controller 206B can increment the counter Cn corresponding to the flashcopy stored at the address Gn on the target volume 208B. At time T25, the counter C0 corresponding to the flashcopy stored at the address G0 on the target volume 208B includes a value of zero, the counter corresponding to the flashcopy stored at the address G1 on the target volume 208B includes a value of three, and the counter Cn corresponding to the flashcopy stored at the address Gn on the target volume 208B includes a value of two.

Figure 5F:
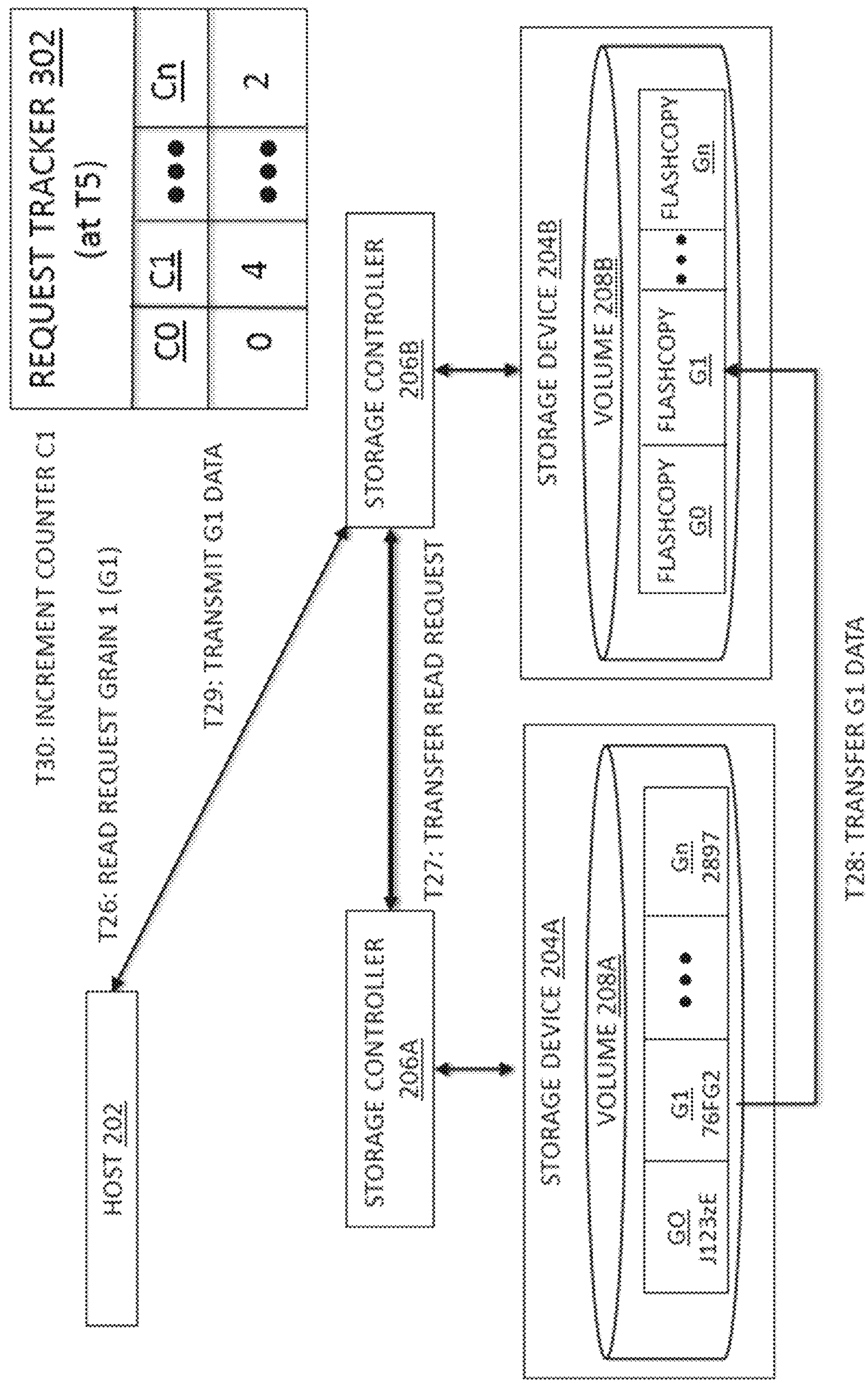

In FIG. 5F and at time T26, the target storage controller 206B receives an I/O request (e.g., a read request) to read the portion of data G1. In response to the request and determining that the G1 address on the target volume 208B includes a flashcopy pointing to the G1 address in the source volume 208A and determining that the counter C1 includes a count and/or value less than five, the target storage controller 206B can transfer the read request to the storage controller 206A (time T27).

The source storage controller 206A, at time T28 and in response to receiving the read request, can transfer the portion of data G1 to the target storage controller 206B. The target storage controller 206B can then transmit the portion of data G1 to the host 202 (at time T29).

At time T30, the target storage controller 206B can increment the counter C1 corresponding to the flashcopy stored at the address G1 on the target volume 208B. At time T30, the counter C0 corresponding to the flashcopy stored at the address G0 on the target volume 208B includes a value of zero, the counter corresponding to the flashcopy stored at the address G1 on the target volume 208B includes a value of four (4), and the counter Cn corresponding to the flashcopy stored at the address Gn on the target volume 208B includes a value of two.

Figure 5G:
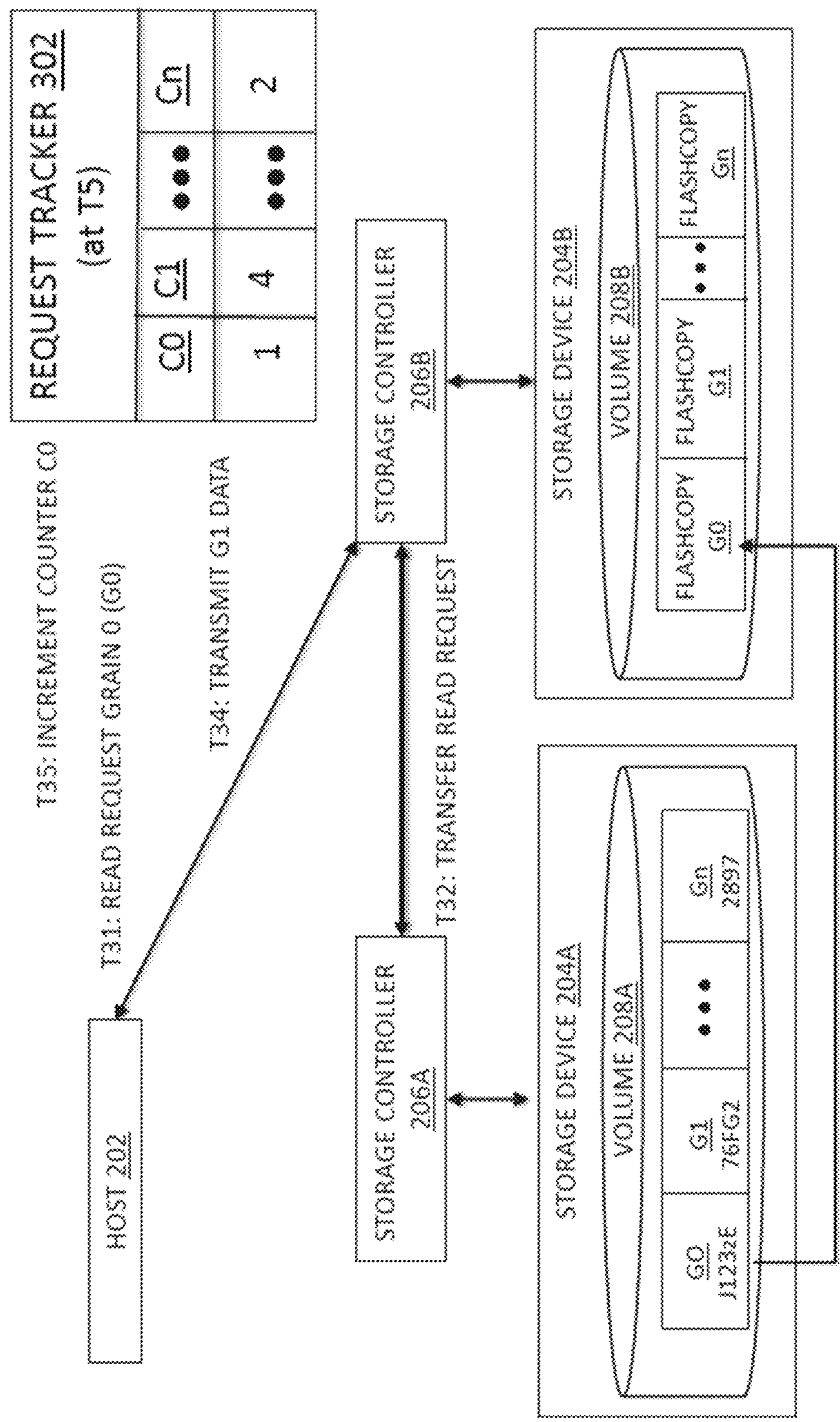

In FIG. 5G and at time T31, the target storage controller 206B receives an I/O request (e.g., a read request) to read a portion (segment, grain, block, etc.) of data G0 (e.g., the portion of data stored at address G0 (J123zE)). In response to the request and determining that the G0 address on the target volume 208B includes a flashcopy pointing to the G0 address in the source volume 208A and determining that the counter C0 includes a count and/or value less than five, the target storage controller 206B can transfer the read request to the storage controller 206A (time T32).

The source storage controller 206A, at time T33 and in response to receiving the read request, can transfer the portion of data G0 to the target storage controller 206B. The target storage controller 206B can then transmit the portion of data G0 to the host 202 (at time T34).

At time T35, the target storage controller 206B can increment the counter C0 corresponding to the flashcopy stored at the address G0 on the target volume 208B. At time T35, the counter C0 corresponding to the flashcopy stored at the address G0 on the target volume 208B includes a value of one, the counter corresponding to the flashcopy stored at the address G1 on the target volume 208B includes a value of four, and the counter Cn corresponding to the flashcopy stored at the address Gn on the target volume 208B includes a value of two.

Figure 5H:
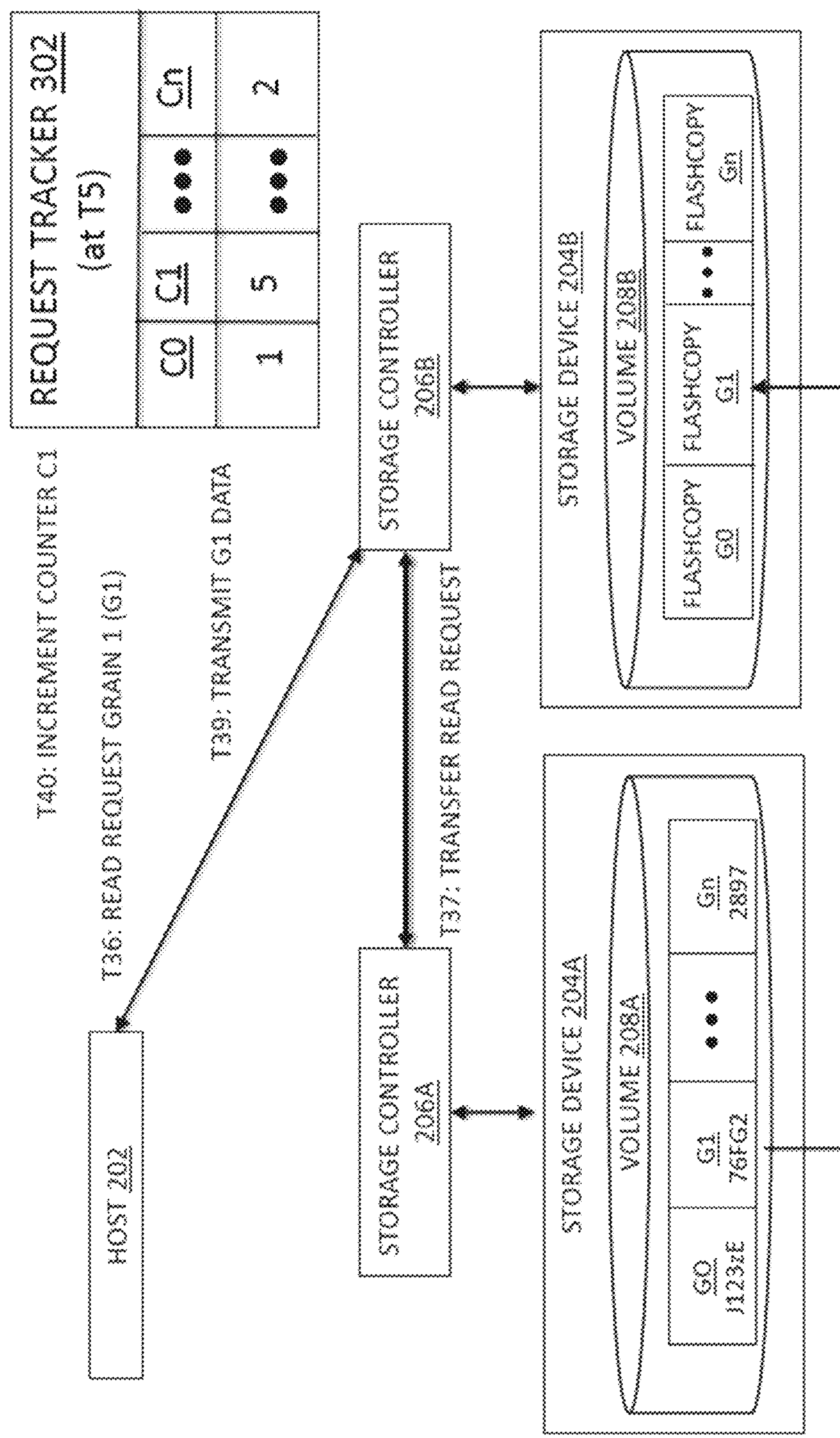

In FIG. 5H and at time T36, the target storage controller 206B receives an I/O request (e.g., a read request) to read the portion of data G1. In response to the request and determining that the G1 address on the target volume 208B includes a flashcopy pointing to the G1 address in the source volume 208A and determining that the counter C1 includes a count and/or value less than five, the target storage controller 206B can transfer the read request to the storage controller 206A (time T37).

The source storage controller 206A, at time T38 and in response to receiving the read request, can transfer the portion of data G1 to the target storage controller 206B. The target storage controller 206B can then transmit the portion of data G1 to the host 202 (at time T39).

At time T40, the target storage controller 206B can increment the counter C1 corresponding to the flashcopy stored at the address G1 on the target volume 208B. At time T40, the counter C0 corresponding to the flashcopy stored at the address G0 on the target volume 208B includes a value of one, the counter corresponding to the flashcopy stored at the address G1 on the target volume 208B includes a value of five, and the counter Cn corresponding to the flashcopy stored at the address Gn on the target volume 208B includes a value of two.

Figure 5I:
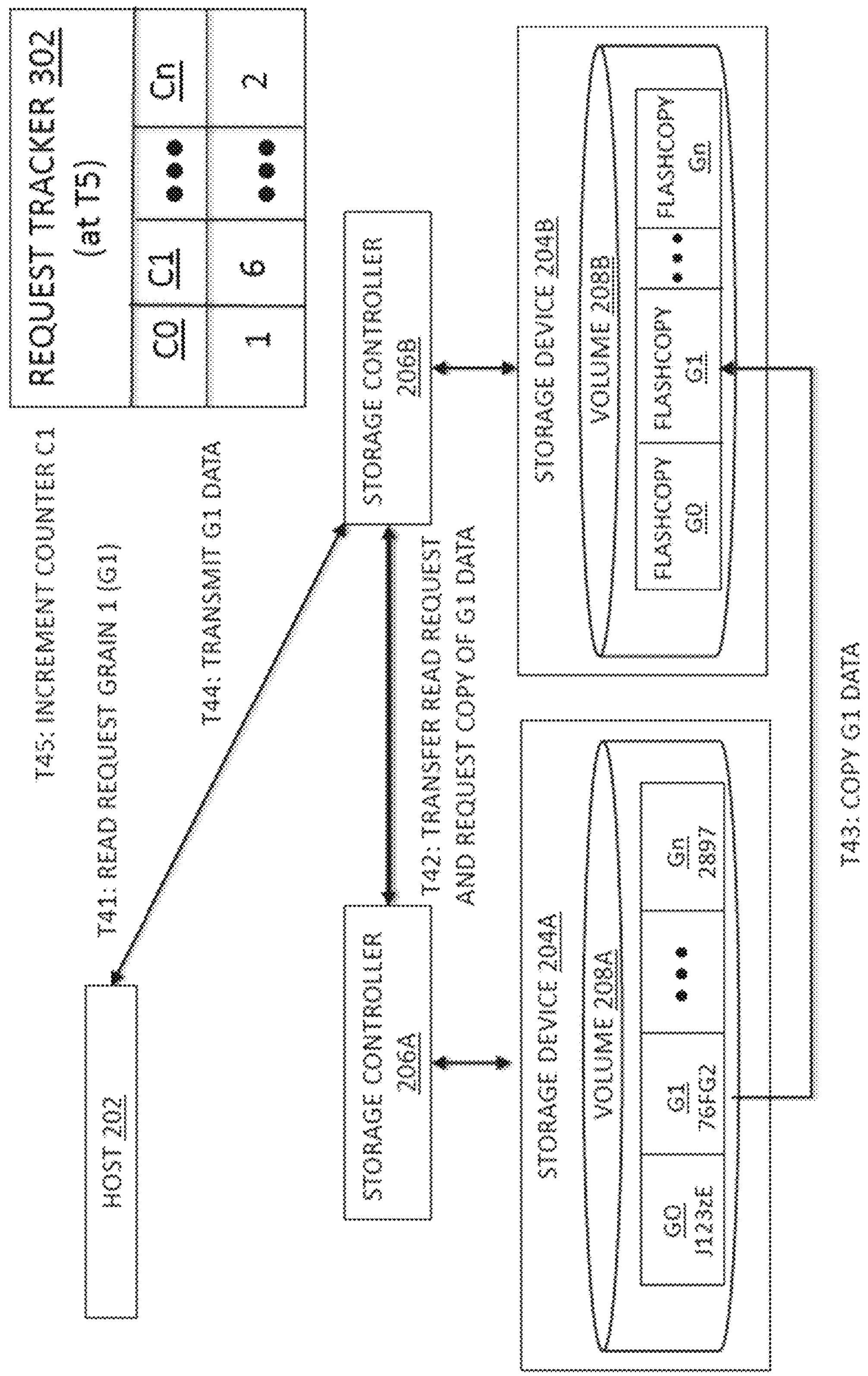

In FIG. 5I and at time T41, the target storage controller 206B receives an I/O request (e.g., a read request) to read the portion of data G1. In response to the request and determining that the G1 address on the target volume 208B includes a flashcopy pointing to the G1 address in the source volume 208A and determining that the counter C1 includes a count and/or value of at least five, the target storage controller 206B can transfer the read request to the storage controller 206A and request that the source controller create and transmit a copy of the portion of data G1 to the target volume 208B (time T42). The source storage controller 206A, at time T43 and in response to receiving the read request and the copy request, can create/generate a copy of the portion of data G1 to the address G1 on the target storage controller 206B. The target storage controller 206B can then transmit the portion of data G1 to the host 202 (at time T44).

At time T45, the target storage controller 206B can increment the counter C1 corresponding to the flashcopy stored at the address G1 on the target volume 208B. At time T45, the counter C0 corresponding to the flashcopy stored at the address G0 on the target volume 208B includes a value of one, the counter corresponding to the flashcopy stored at the address G1 on the target volume 208B includes a value of six (6), and the counter Cn corresponding to the flashcopy stored at the address Gn on the target volume 208B includes a value of two.

Figure 5J:
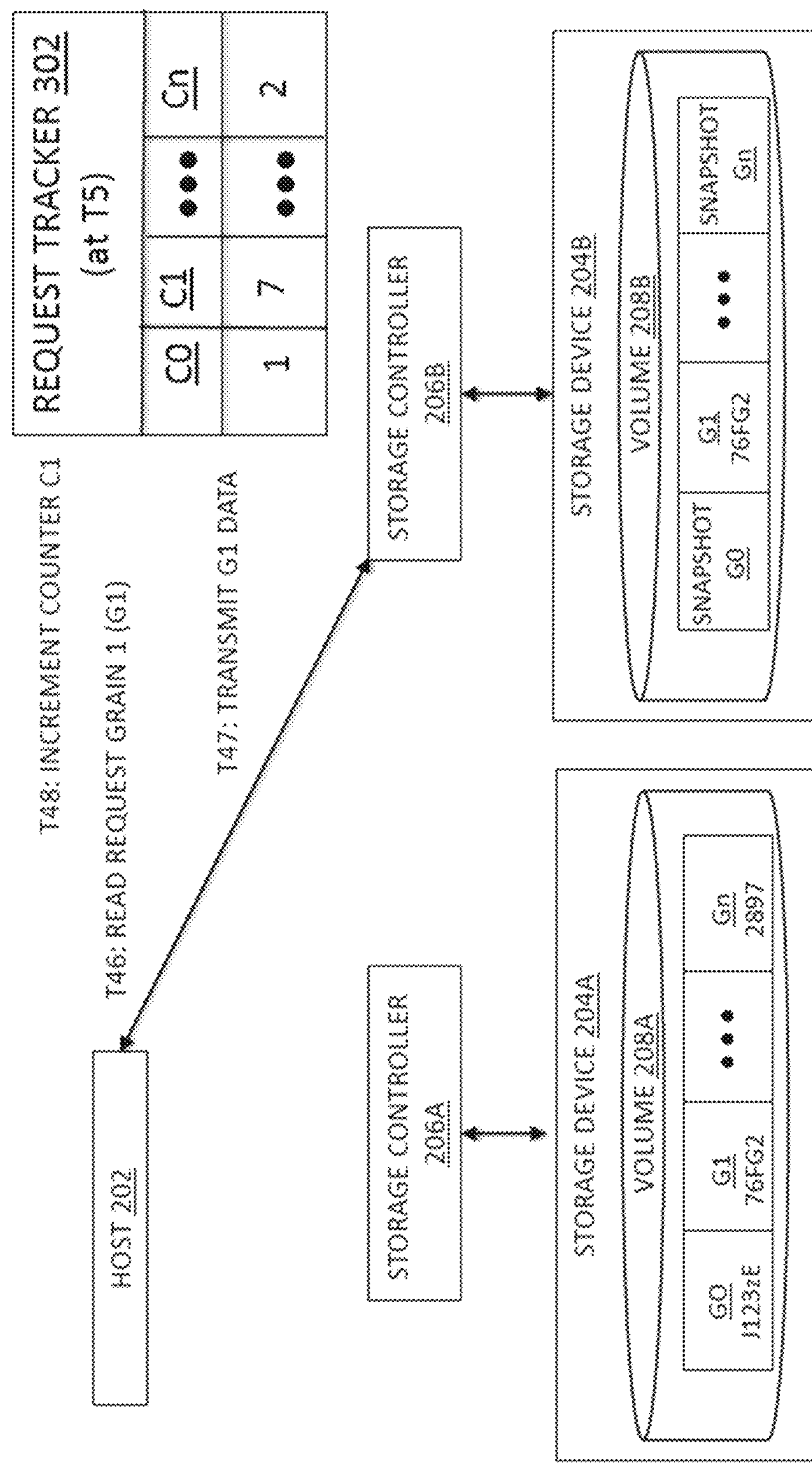

In FIG. 5J and at time T46, the target storage controller 206B receives an I/O request (e.g., a read request) to read the portion of data G1. In response to the request and determining that the G1 address on the target volume 208B includes a copy of portion of the data G1, the target storage controller 206B can transmit the portion of data G1 to the host 202 (at time T47).

At time T48, the target storage controller 206B can increment the counter C1 corresponding to the address G1 on the target volume 208B. At time T48, the counter C0 corresponding to the flashcopy stored at the address G0 on the target volume 208B includes a value of one, the counter corresponding to the flashcopy stored at the address G1 on the target volume 208B includes a value of seven (7), and the counter Cn corresponding to the flashcopy stored at the address Gn on the target volume 208B includes a value of two.

Figure 5K:
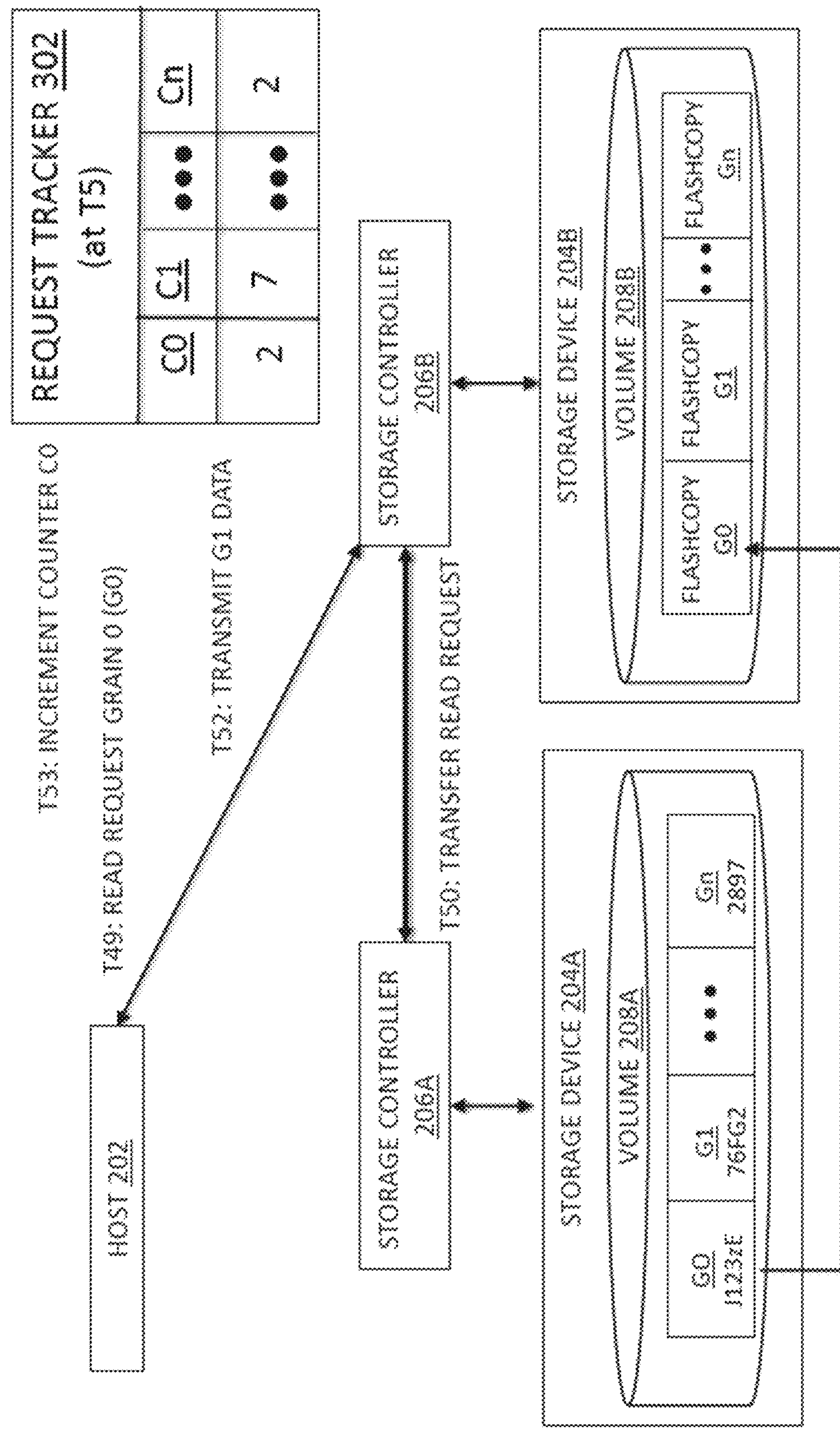

In FIG. 5K and at time T49, the target storage controller 206B receives an I/O request (e.g., a read request) to read the portion of data G0. In response to the request and determining that the G0 address on the target volume 208B includes a flashcopy pointing to the G0 address in the source volume 208A and determining that the counter C0 includes a count and/or value less than five, the target storage controller 206B can transfer the read request to the storage controller 206A (time T50).

The source storage controller 206A, at time T51 and in response to receiving the read request, can transfer the portion of data G0 to the target storage controller 206B. The target storage controller 206B can then transmit the portion of data G0 to the host 202 (at time T52).

At time T53, the target storage controller 206B can increment the counter C0 corresponding to the flashcopy stored at the address G0 on the target volume 208B. At time T53, the counter C0 corresponding to the flashcopy stored at the address G0 on the target volume 208B includes a value of two, the counter corresponding to the flashcopy stored at the address G1 on the target volume 208B includes a value of seven, and the counter Cn corresponding to the flashcopy stored at the address Gn on the target volume 208B includes a value of two.

The operations discussed in FIGS. 5A through 5K can continue consistent with the above description. As such, the various embodiments can improve efficiency and/or reduce latency by storing/copy frequently requested portions of data (e.g., portions of data requested greater than and/or equal to five times) from a source volume 208A and/or source storage device 204A to a target volume 208B and/or target storage device 204B because such operations can reduce the number of operations performed when the portion of data is requested (e.g., by storing the actual data on the source volume 208A (and source storage device 204A) and on the target volume 208AB (and target storage device 204B).

While FIGS. 5A through 5K discuss incrementing a counter each time that a flashcopy/snapshot on a target volume 208B and/or target storage device 204B representing a grain of data is the subject of an I/O request, the various embodiments disclosed herein are not limited to such. That is, various embodiments can further include incrementing a counter C each time that the grain of data itself (e.g., on a source volume 208A and/or source storage device 204A) is the subject of an I/O request.

Figure 6:
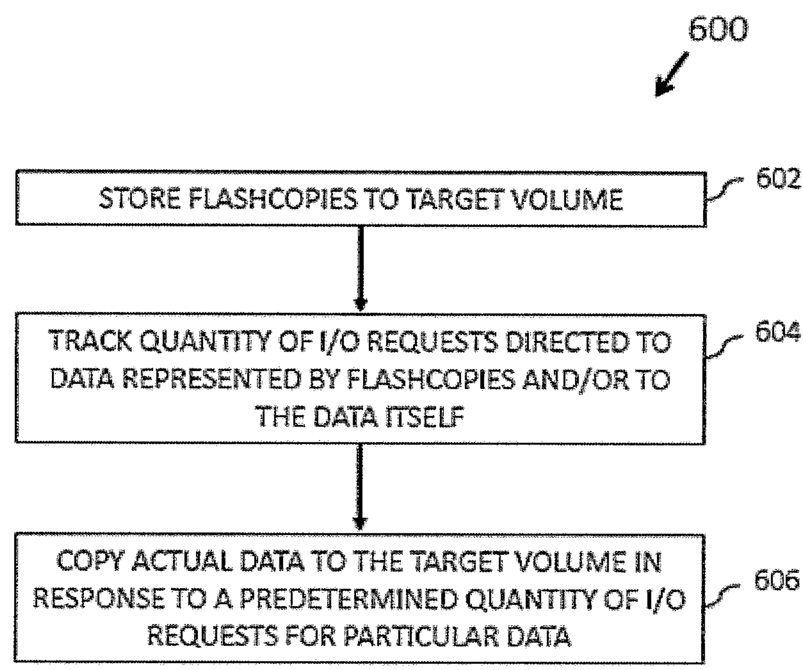
FIG. 6 is a schematic flow chart diagram illustrating one embodiment of a method for flashcopy tracking for storage optimization.

Referring to FIG. 6, FIG. 6 is a schematic flow chart diagram illustrating one embodiment of a method 600 for flashcopy tracking for storage optimization. At least in the illustrated embodiment, the method 600 can begin by a processor (e.g., a processor 302A and processor 302B, etc., also simply processor 302) creating and/or storing a set of flashcopies (e.g., flashcopy G0, flashcopy G1, . . . flashcopy Gn) and/or snapshots representing and/or pointing to portions of data (e.g., grains of data G0, G1, . . . Gn) stored in a source volume 208 and/or a source storage device 204 to a target volume 208 and/or a target storage device 204 (block 602).

The processor 302 can further track the quantity of I/O requests (e.g., read requests) directed to each portion of data represented by a flashcopy on the target volume 208 and/or target storage device 204 and/or to the portion (e.g., grain) of data itself (block 604). In various embodiments, the processor 302 can utilize a request tracker 302 to increment a set of counters (e.g., counters C0, C1, . . . Cn) associated with a respective flashcopy and/or grain of data to track the quantity of I/O requests directed to each flashcopy and/or grain of data.

In response to the count and/or value included in a counter corresponding to a particular portion of data and/or flashcopy being equal to and/or greater than a predetermined/threshold count/value, the processor 302 can copy the actual data represented by the flashcopy from the source volume 208 and/or source storage device 204 to the target volume 208 and/or target storage device 204 (block 606). In some embodiments, copying can include creating a copy of the actual data and transmitting/transferring the copy from the source volume 208 and/or source storage device 204 to the target volume 208 and/or target storage device 204.

Figure 7:
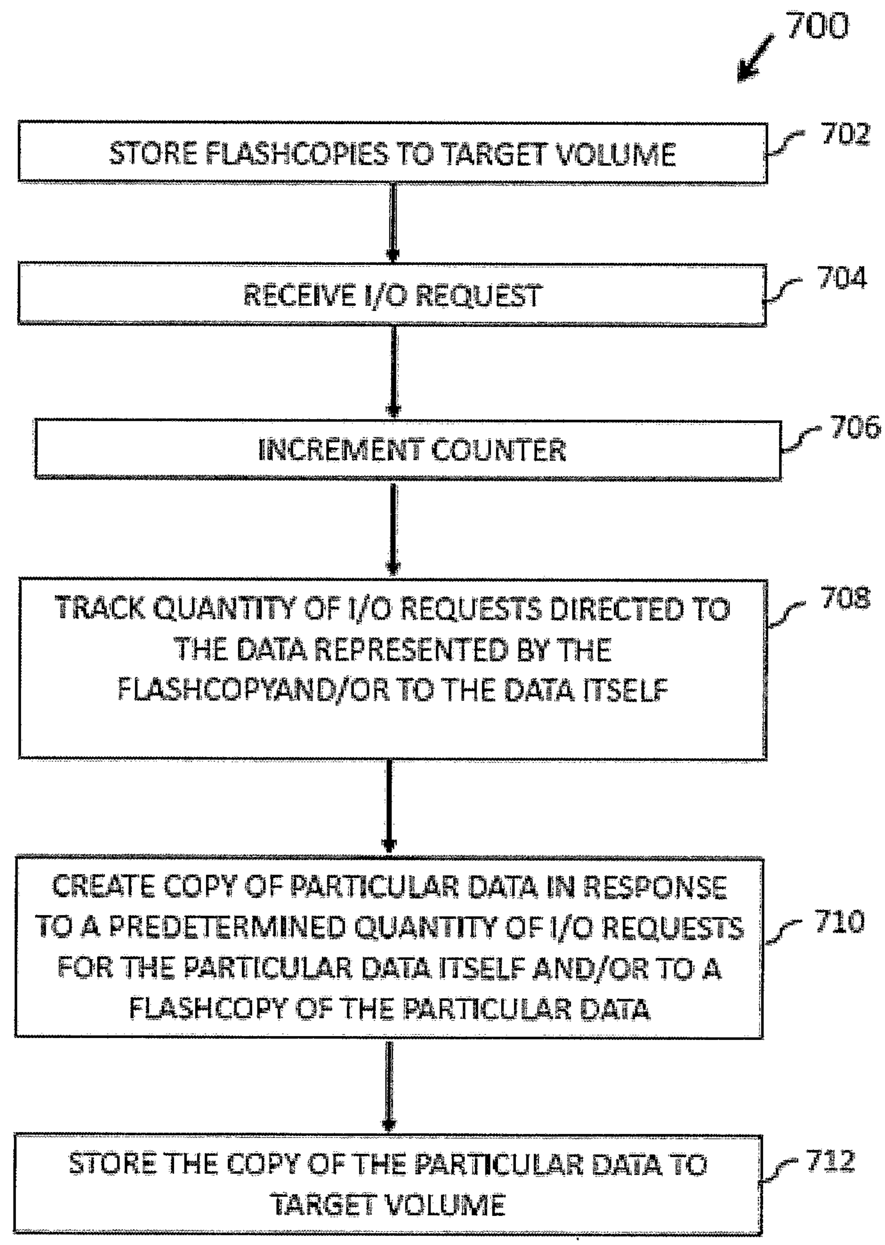
FIG. 7 is a schematic flow chart diagram illustrating another embodiment of a method for flashcopy tracking for storage optimization.

With reference to FIG. 7, FIG. 7 is a schematic flow chart diagram illustrating one embodiment of another method 700 for flashcopy tracking for storage optimization. At least in the illustrated embodiment, the method 700 can begin by a processor (e.g., a processor 302A and processor 302B, etc., also simply processor 302) creating and/or storing a set of flashcopies (e.g., flashcopy G0, flashcopy G1, . . . flashcopy Gn) and/or snapshots representing and/or pointing to portions of data (e.g., grains of data G0, G1, . . . Gn) stored in a source volume 208 and/or a source storage device 204 to a target volume 208 and/or a target storage device 204 (block 702).

The processor 302 can receive an I/O request (e.g., a read request) from a host 202 to read a portion (grain) of data represented by a flashcopy on the target volume 208 and/or target storage device 204 and/or to the grain of data itself (block 704). In response to such request, the processor can increment the counter C corresponding to the flashcopy on the target volume 208 and/or target storage device 204 and/or to the grain of data itself (block 706).

In various embodiments, the processor 302 can track the quantity of I/O requests (e.g., read requests) directed to the portion of data represented by the flashcopy on the target volume 208 and/or target storage device 204 and/or to the grain of data itself (block 708). In various embodiments, the processor 302 can utilize a request tracker 302 to increment the counter C associated with the flashcopy and/or the grain of data.

In response to the count and/or value included in the counter C corresponding to the particular portion of data and/or flashcopy being equal to and/or greater than a predetermined/threshold count/value, the processor 302 can create a copy of the actual data represented by the flashcopy from the source volume 208 and/or source storage device 204 to the target volume 208 and/or target storage device 204 (block 710). In some embodiments, the copy is transmitted/transferred from the source volume 208 and/or source storage device 204 to the target volume 208 and/or target storage device 204 for storage thereon (block 712).

Figure 8:
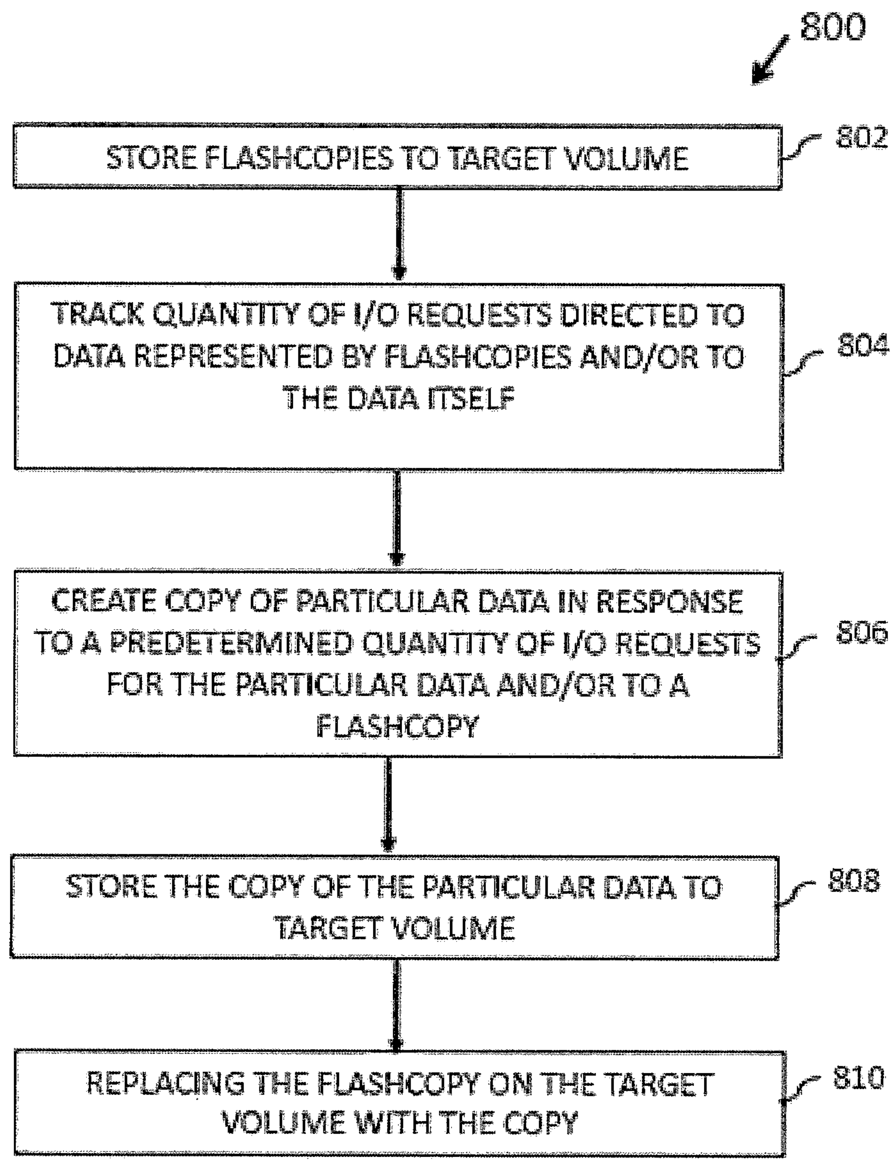
FIG. 8 is a schematic flow chart diagram illustrating one embodiment of yet another embodiment of a method for flashcopy tracking for storage optimization.

Referring to FIG. 8, FIG. 8 is a schematic flow chart diagram illustrating one embodiment of yet another method 800 for flashcopy tracking for storage optimization. At least in the illustrated embodiment, the method 800 can begin by a processor (e.g., a processor 302A and processor 302B, etc., also simply processor 302) creating and/or storing a set of flashcopies (e.g., flashcopy G0, flashcopy G1, . . . flashcopy Gn) and/or snapshots representing and/or pointing to portions of data (e.g., grains of data G0, G1, . . . Gn) stored in a source volume 208 and/or a source storage device 204 to a target volume 208 and/or a target storage device 204 (block 802).

The processor 302 can track the quantity of I/O requests (e.g., read requests) directed to each portion of data represented by a flashcopy on the target volume 208 and/or target storage device 204 and/or to the grain of data itself (block 804). In various embodiments, the processor 302 can utilize a request tracker 302 to increment a counter C associated each respective flashcopy and/or grain of data.

In response to the count and/or value included in a counter C corresponding to the particular portion of data and/or flashcopy being equal to and/or greater than a predetermined/threshold count/value, the processor 302 can create a copy of the actual data represented by the flashcopy from the source volume 208 and/or source storage device 204 to the target volume 208 and/or target storage device 204 (block 806). In various embodiments, the copy is transmitted/transferred from the source volume 208 and/or source storage device 204 to the target volume 208 and/or target storage device 204 for storage thereon (block 808).

The processor 302 can replace the flashcopy on the target volume 208 and/or target storage device 204 with the copy (block 810). The copy can be stored at the same location as the replaced flashcopy or at a different storage location on the target volume 208 and/or target storage device 204.

Figure 9:
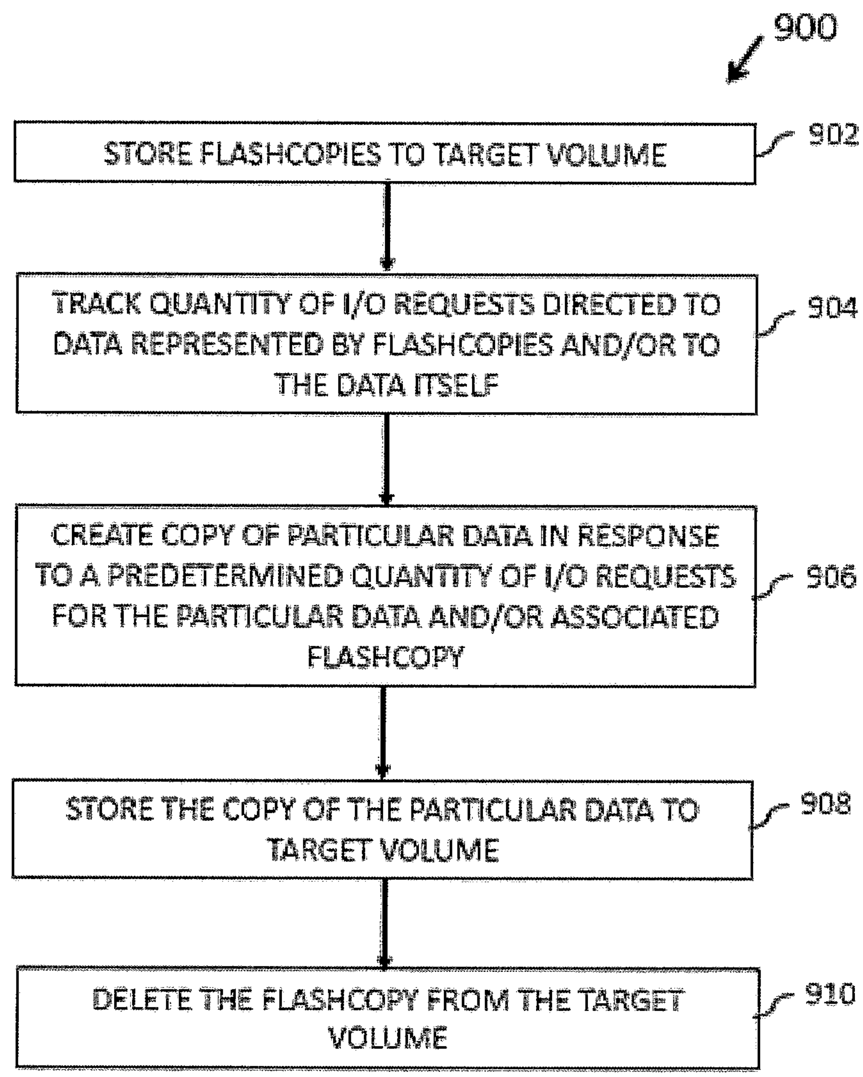
FIG. 9 is a schematic flow chart diagram illustrating one embodiment of still another embodiment of a method for flashcopy tracking for storage optimization.

With reference to FIG. 9, FIG. 9 is a schematic flow chart diagram illustrating one embodiment of yet another method 900 for flashcopy tracking for storage optimization. At least in the illustrated embodiment, the method 900 can begin by a processor (e.g., a processor 302A and processor 302B, etc., also simply processor 302) creating and/or storing a set of flashcopies (e.g., flashcopy G0, flashcopy G1, . . . flashcopy Gn) and/or snapshots representing and/or pointing to portions of data (e.g., grains of data G0, G1, . . . Gn) stored in a source volume 208 and/or a source storage device 204 to a target volume 208 and/or a target storage device 204 (block 902).

The processor 302 can track the quantity of I/O requests (e.g., read requests) directed to each portion of data represented by a flashcopy on the target volume 208 and/or target storage device 204 and/or to the grain of data itself (block 904). In various embodiments, the processor 302 can utilize a request tracker 302 to increment a counter C associated each respective flashcopy and/or grain of data In response to the count and/or value included in a counter C corresponding to the particular portion of data and/or flashcopy being equal to and/or greater than a predetermined/threshold count/value, the processor 302 can create a copy of the actual data represented by the flashcopy from the source volume 208 and/or source storage device 204 to the target volume 208 and/or target storage device 204 (block 906). In various embodiments, the copy is transmitted/transferred from the source volume 208 and/or source storage device 204 to the target volume 208 and/or target storage device 204 for storage thereon (block 908).

After the copy is stored on the target volume 208 and/or target storage device 204, the processor 302 can delete the flashcopy from the target volume 208 and/or target storage device 204 (block 910). The flashcopy can be deleted immediately or substantially immediately after the actual copy is stored on the target volume 208 and/or target storage device 204 or after the actual copy has been stored for a predetermined/threshold amount of time, which can be any suitable amount of time. In some embodiments, the flashcopy can be deleted as a portion of a garbage collection process, which may include any garbage collection process that is known or developed in the future.

Figure 10:
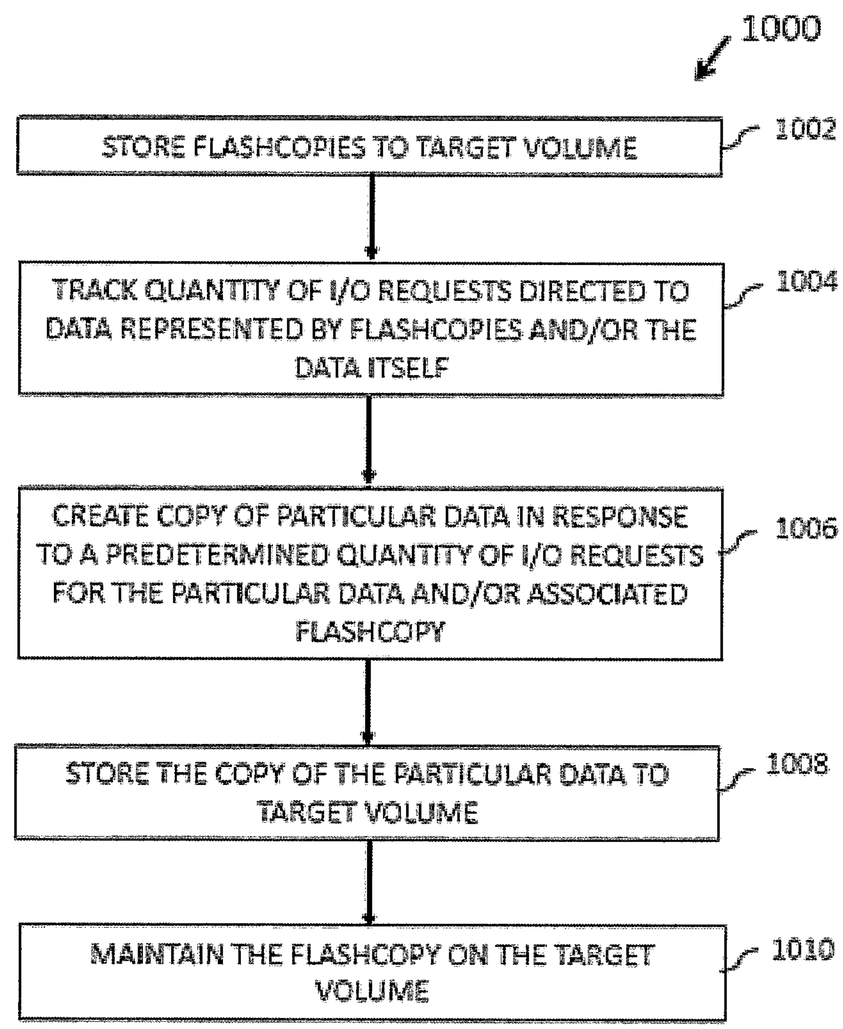
FIG. 10 is a schematic flow chart diagram illustrating one embodiment of another embodiment of a method for flashcopy tracking for storage optimization.

Referring to FIG. 10, FIG. 10 is a schematic flow chart diagram illustrating one embodiment of another method 1000 for flashcopy tracking for storage optimization. At least in the illustrated embodiment, the method 1000 can begin by a processor (e.g., a processor 302A and processor 302B, etc., also simply processor 302) creating and/or storing a set of flashcopies (e.g., flashcopy G0, flashcopy G1, . . . flashcopy Gn) and/or snapshots representing and/or pointing to portions of data (e.g., grains of data G0, G1, . . . Gn) stored in a source volume 208 and/or a source storage device 204 to a target volume 208 and/or a target storage device 204 (block 1002).

The processor 302 can track the quantity of I/O requests (e.g., read requests) directed to each portion of data represented by a flashcopy on the target volume 208 and/or target storage device 204 and/or to the grain of data itself (block 1004). In various embodiments, the processor 302 can utilize a request tracker 302 to increment a counter C associated each respective flashcopy and/or grain of data.

In response to the count and/or value included in a counter C corresponding to the particular portion of data and/or flashcopy being equal to and/or greater than a predetermined/threshold count/value, the processor 302 can create a copy of the actual data represented by the flashcopy from the source volume 208 and/or source storage device 204 to the target volume 208 and/or target storage device 204 (block 1006). In various embodiments, the copy is transmitted/transferred from the source volume 208 and/or source storage device 204 to the target volume 208 and/or target storage device 204 for storage thereon (block 1008).

After the copy is stored on the target volume 208 and/or target storage device 204, the processor 302 can maintain the flashcopy on the target volume 208 and/or target storage device 204 (block 1010). The flashcopy can be permanently or substantially permanently maintained and/or stored on the target volume 208 and/or target storage device 204 or maintained/stored for a predetermined/threshold amount of time, which can be any suitable amount of time.

Figure 11:
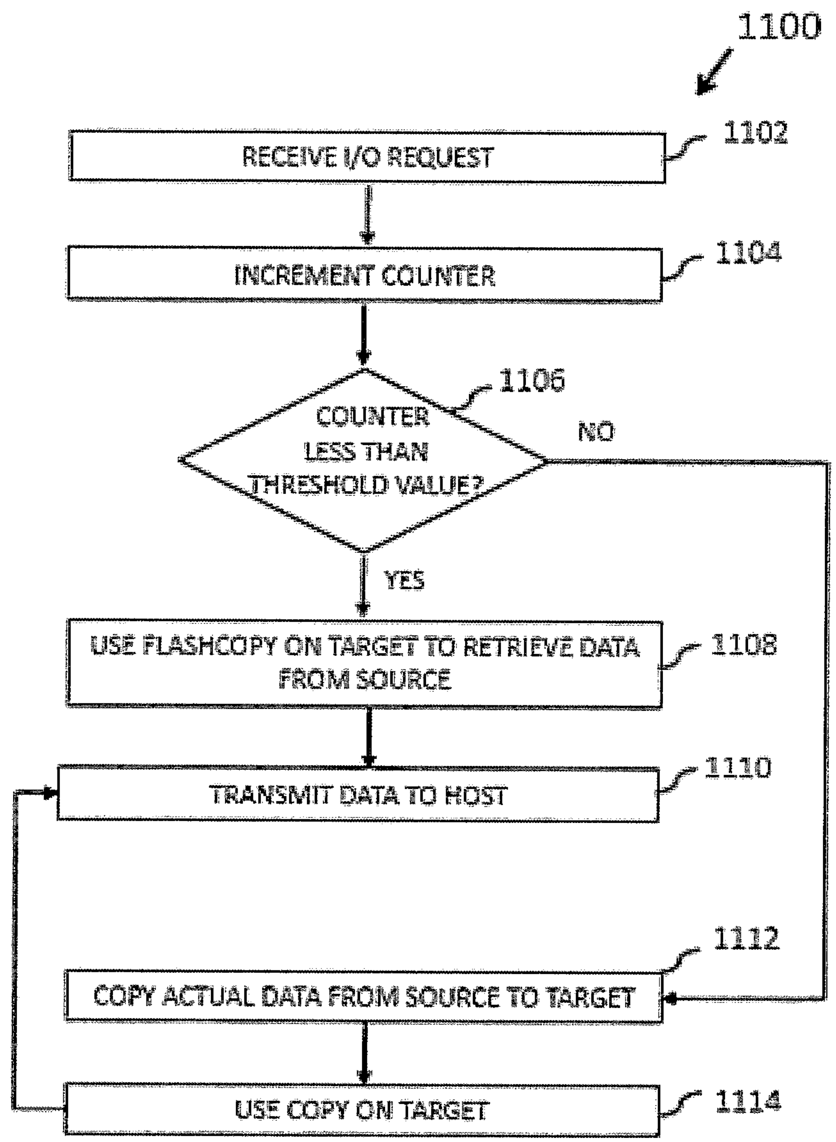
FIG. 11 is a schematic flow chart diagram illustrating one embodiment of yet another embodiment of a method for flashcopy tracking for storage optimization.

With reference to FIG. 11, FIG. 11 is a schematic flow chart diagram illustrating one embodiment of still another method 1100 for flashcopy tracking for storage optimization. At least in the illustrated embodiment, the method 1100 can begin by receiving an I/O request (e.g., a read request) from a host 202 to read a portion of data represented by a flashcopy on the target volume 208 and/or target storage device 204 (block 1102).

In response to such request, the processor can increment a counter C corresponding to the flashcopy on the target volume 208 and/or target storage device 204 (block 1104). The processor 302 can then determine if the counter C is less than a predetermined/threshold value and/or count (block 1106).

The processor 302, in response to determining that the count/value is less than the predetermined/threshold value and/or count (e.g., "YES" in block 1106), can use the flashcopy on the target volume 208 and/or target storage device 204 to retrieve the portion of data in the I/O request from the source volume 208 and/or source storage device 204 (block 1108). The processor 302 can then transmit the requested portion of data to the host 202 (block 1110).

In response to determining that the count/value is greater than and/or equal to the predetermined/threshold value and/or count (e.g., a "NO" in block 1106), the processor 302 can create an actual copy of the portion of data stored on the source volume 208 and/or source storage device 204 and transfer the actual copy to the target volume 208 and/or target storage device 204 for storage (block 1112). The processor 302 can then use the actual copy on the target volume 208 and/or target storage device 204 to retrieve the portion of data in the I/O request (block 1114) and transmit the requested portion of data to the host 202 (block 1110).

The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:

a flash module that stores flashcopies of data to a target volume, wherein the data is stored on a source volume and each flashcopy represents a particular portion of the data stored on the source volume;

a tracking module that tracks a quantity of input/output (I/O) requests for each respective portion of the data on the target volume represented by a flashcopy; and a copy module that copies a first portion of the data from the source volume to a storage location on the target volume in response to receiving a predetermined quantity of I/O requests on the target volume for the first portion of the data, wherein:

the copied first portion of the data replaces a first flashcopy associated with the first portion of the data at the same storage location on the target volume, and at least a portion of said modules comprise one or more of a set of hardware circuits, a set of programmable hardware devices, and executable code stored on a set of non-transitory computer-readable storage mediums.

2. The apparatus of claim 1, further comprising:

a plurality of counters, wherein each counter is associated with a respective flashcopy on the target volume;

an I/O module that receives I/O requests directed to portions of the data represented by the flashcopies on the target volume; and a count module increments the counter associated with a particular flashcopy on the target volume in response to receiving an I/O request for the portion of the data associated with the particular flashcopy to which the I/O request is directed.

3. The apparatus of claim 1, further comprising:

a storage module that stores each portion of the data copied from the source volume to the target volume.

4. The apparatus of claim 3, wherein:

the storage module replaces each flashcopy on the target volume with a corresponding portion of the data copied from the source volume to the target volume at the same respective storage location when storing each portion of the data.

5. The apparatus of claim 3, wherein:

the storage module is further configured to store a second portion of the data copied from the source volume to the target volume at a different storage location than a second flashcopy associated with the second portion of the data when storing the second portion of the data.

6. The apparatus of claim 5, further comprising:

a garbage collection module that deletes the second flashcopy from the target volume in response to the second portion of the data being stored at the different location on the target volume.

7. A system, comprising:

a source volume that stores data;

a target volume that stores flashcopies of the data, each flashcopy representing a particular portion of the data stored on the source volume; and a processor configured to:

track a quantity of input/output (I/O) requests for each respective portion of the data on the target volume represented by a flashcopy, and copy a first portion of the data from the source volume to a storage location on the target volume in response to receiving a predetermined quantity of I/O requests on the target volume for the first portion of the data, wherein the copied first portion of the data replaces a first flashcopy associated with the first portion of the data at the same storage location on the target volume.

8. The system of claim 7, wherein:

the processor comprises a plurality of counters, each counter associated with a respective flashcopy on the target volume; and the processor is further configured to:

receive I/O requests directed to portions of the data represented by the flashcopies on the target volume, and increment the counter associated with a particular flashcopy on the target volume in response to receiving an I/O request for the portion of the data associated with the particular flashcopy to which the I/O request is directed.

9. The system of claim 7, wherein the processor is further configured to:

store each portion of the data copied from the source volume to the target volume.

10. The system of claim 9, wherein the processor is further configured to:

replace each flashcopy on the target volume with a corresponding portion of the data copied from the source volume to the target volume at the same respective storage location when storing each portion of the data.

11. The system of claim 9, wherein the processor is further configured to:

store a second portion of the data copied from the source volume to the target volume at a different storage location than a second flashcopy associated with the second portion of the data when storing the second portion of the data.

12. The system of claim 11, wherein the processor is further configured to:

delete the second flashcopy from the target volume in response to the second portion of the data being stored at the different location on the target volume.

13. The system of claim 12, wherein deleting the second flashcopy from the target volume is performed as at least a portion of a garbage collection process.

14. A method, comprising:

storing, by a processor, flashcopies of data to a target volume, wherein the data is stored on a source volume and each flashcopy represents a particular portion of the data;

tracking a quantity of input/output (I/O) requests for each respective portion of the data on the target volume represented by a flashcopy; and copying a first portion of the data from the source volume to a storage location on the target volume in response to receiving a predetermined quantity of I/O requests on the target volume for the first portion of the data, wherein the copied first portion of the data replaces a first flashcopy associated with the first portion of the data at the same storage location on the target volume.

15. The method of claim 14, wherein the processor comprises a plurality of counters, each counter associated with a respective flashcopy on the target volume, the method further comprising:

receiving I/O requests directed to portions of the data represented by the flashcopies on the target volume; and incrementing the counter associated with a particular flashcopy on the target volume in response to receiving an I/O request for the portion of the data associated with the particular flashcopy to which the I/O request is directed.

16. The method of claim 14, further comprising:

storing each portion of the data copied from the source volume to the target volume.

17. The method of claim 16, further comprising:

replacing each flashcopy on the target volume with a corresponding portion of the data copied from the source volume to the target volume at the same respective storage location when storing each portion of the data.

18. The method of claim 16, further comprising:

storing a second portion of the data from the source volume to the target volume at a different storage location than a second flashcopy associated with the second portion of the data when storing the second portion of the data.

19. The method of claim 18, further comprising:

deleting the second flashcopy from the target volume, as at least a portion of a garbage collection process, in response to the second portion of the data being stored at the different location on the target volume.

20. The method of claim 18, further comprising:

continuing to store the second flashcopy on the target volume for a predetermined amount of time after the second portion of the data is copied and stored at the different location on the target volume.

* * * * *